(12) United States Patent
Krishnaiyer et al.

(10) Patent No.: US 10,628,141 B2
(45) Date of Patent: Apr. 21, 2020

(54) COMPILER TRANSFORMATION WITH LOOP AND DATA PARTITIONING

(71) Applicant: INTEL CORPORATION, Santa Clara, CA (US)

(72) Inventors: Rakesh Krishnaiyer, Milpitas, CA (US); Konstantin Bobrovskii, Cupertino, CA (US); Dmitry Budanov, Cupertino, CA (US)

(73) Assignee: INTEL CORPORATION, Santa Clara, CA (US)

( * ) Notice: Subject to any disclaimer, the term of this patent is extended or adjusted under 35 U.S.C. 154(b) by 12 days.

(21) Appl. No.: 15/972,345

(22) Filed: May 7, 2018

(65) Prior Publication Data

US 2019/0042221 A1    Feb. 7, 2019

(51) Int. Cl.
*G06F 8/41*          (2018.01)
*G06F 8/40*          (2018.01)

(52) U.S. Cl.
CPC .............. *G06F 8/4434* (2013.01); *G06F 8/40* (2013.01); *G06F 8/443* (2013.01); *G06F 8/45* (2013.01); *G06F 8/452* (2013.01)

(58) Field of Classification Search
CPC . G06F 8/4434; G06F 8/45; G06F 8/40; G06F 8/443; G06F 8/452
See application file for complete search history.

(56) References Cited

U.S. PATENT DOCUMENTS

| 5,953,531 | A  * | 9/1999 | Megiddo | G06F 8/443 |
| | | | | 717/160 |
| 6,016,397 | A  * | 1/2000 | Ogasawara | G06F 8/452 |
| | | | | 717/160 |
| 6,324,629 | B1 * | 11/2001 | Kulkarni | G06F 12/0864 |
| | | | | 711/118 |
| 6,507,947 | B1 * | 1/2003 | Schreiber | G06F 8/452 |
| | | | | 717/159 |
| 6,681,388 | B1 * | 1/2004 | Sato | G06F 8/453 |
| | | | | 717/149 |
| 6,952,821 | B2 * | 10/2005 | Schreiber | 711/165 |
| 2006/0080372 | A1 * | 4/2006 | Barua | G06F 9/5016 |

(Continued)

OTHER PUBLICATIONS

Falk et al., "Source Code Optimization Techniques for Data Flow Dominated Embedded Software" (Year: 2004).*

(Continued)

*Primary Examiner* — Phillip H Nguyen

(57) ABSTRACT

Logic may transform a target code to partition data automatically and/or autonomously based on a memory constraint associated with a resource such as a target device. Logic may identify a tag in the code to identify a task, wherein the task comprises at least one loop, the loop to process data elements in one or more arrays. Logic may automatically generate instructions to determine one or more partitions for the at least one loop to partition data elements, accessed by one or more memory access instructions for the one or more arrays within the at least one loop, based on a memory constraint, the memory constraint to identify an amount of memory available for allocation to process the task. Logic may determine one or more iteration space blocks for the parallel loops, determine memory windows for each block, copy data into and out of constrained memory, and transform array accesses.

22 Claims, 12 Drawing Sheets

(56) References Cited

U.S. PATENT DOCUMENTS

2010/0218196 A1* 8/2010 Leung ................... G06F 8/453
718/107
2016/0110171 A1* 4/2016 Bikshandi ............. G06F 7/4806
717/160

OTHER PUBLICATIONS

Hudak et al., "Compiler Techniques for Data Partitioning of Sequentially Iterated Parallel Loops" (Year: 1990).*
Lim et al., "Blocking and Array Contraction Across Arbitrarily Nested Loops Using Affine Partitioning" (Year: 2001).*
Agarwal et al., "Automatic Partitioning of Parallel Loops and Data Arrays for Distributed Shared-Memory Multiprocessors" (Year: 1995).*

* cited by examiner

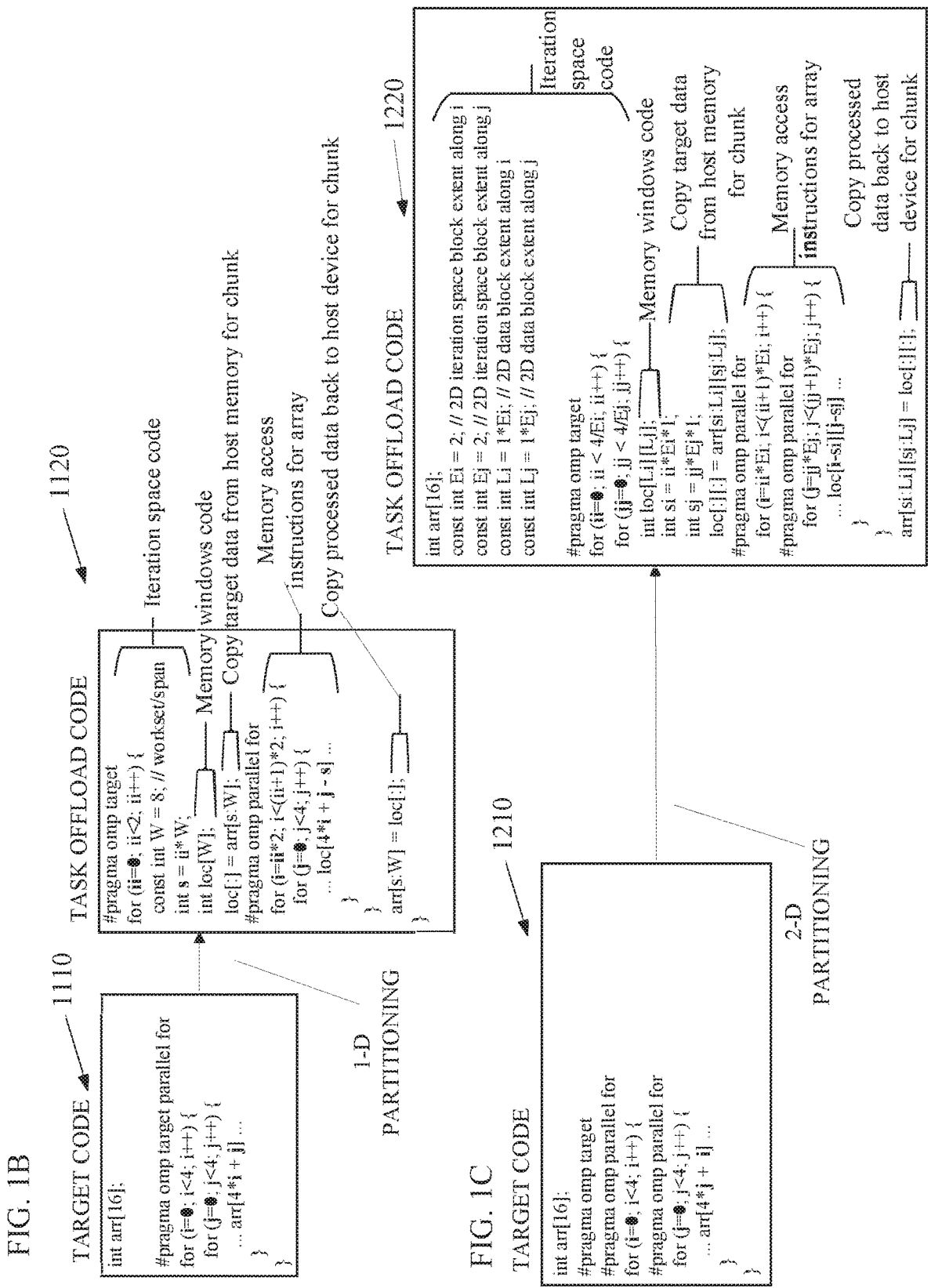

1-D PARTITIONING — 1300

| arr index -> | 0 | 1 | 2 | 3 | 4 | 5 | 6 | 7 | 8 | 9 | 10 | 11 | 12 | 13 | 14 | 15 | Span |
|---|---|---|---|---|---|---|---|---|---|---|---|---|---|---|---|---|---|
| i=0 | X | X | X | | | | | | | | | | | | | | 0..12 |
| i=1 | | X | X | X | | | | | | | | | | | | | 1..13 |
| i=2 | | | X | X | X | | | | | | | | | | | | 2..14 |
| i=3 | | | | X | X | X | X | X | X | X | X | X | X | X | X | X | 3..15 |

FIG. 1D

2-D PARTITIONING (ITERATION SPACE) — 1400

| | ii=0 | | ii=1 | |
|---|---|---|---|---|
| | i=0 | i=1 | i=0 | i=1 |
| jj=0 | j=0 | parallel i-space chunk(0,0) | | parallel i-space chunk(0,1) | |
| | j=1 | parallel i-space chunk(1,0) | | parallel i-space chunk(1,1) | |
| jj=1 | j=0 | | | | |
| | j=1 | | | | |

FIG. 1E

2-D PARTITIONING (DATA SPACE) — 1500

| dim0/dim1 | 0 | 1 | 2 | 3 |
|---|---|---|---|---|
| 0 | span over chunk(0,0) | | span over chunk(0,1) | |
| 1 | | | | |
| 2 | span over chunk(1,0) | | span over chunk(1,1) | |
| 3 | | | | |

FIG. 1F

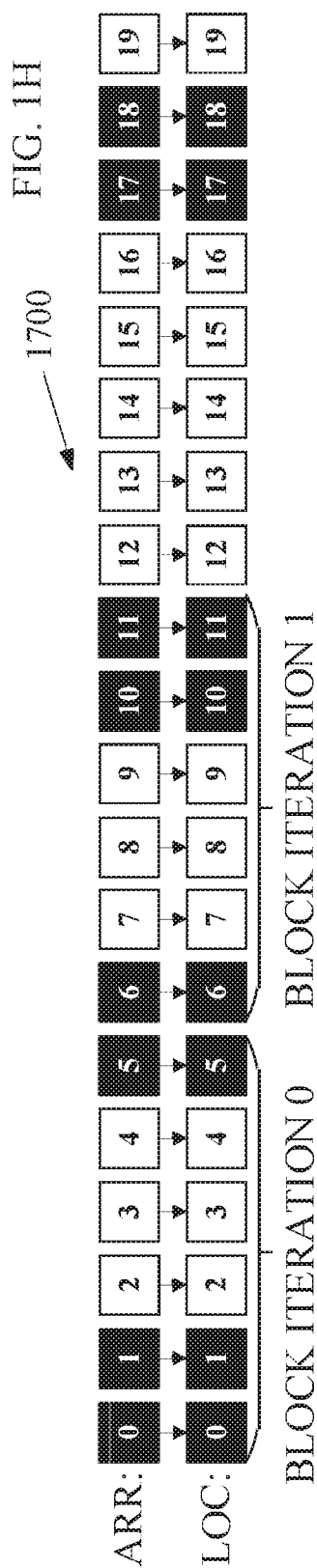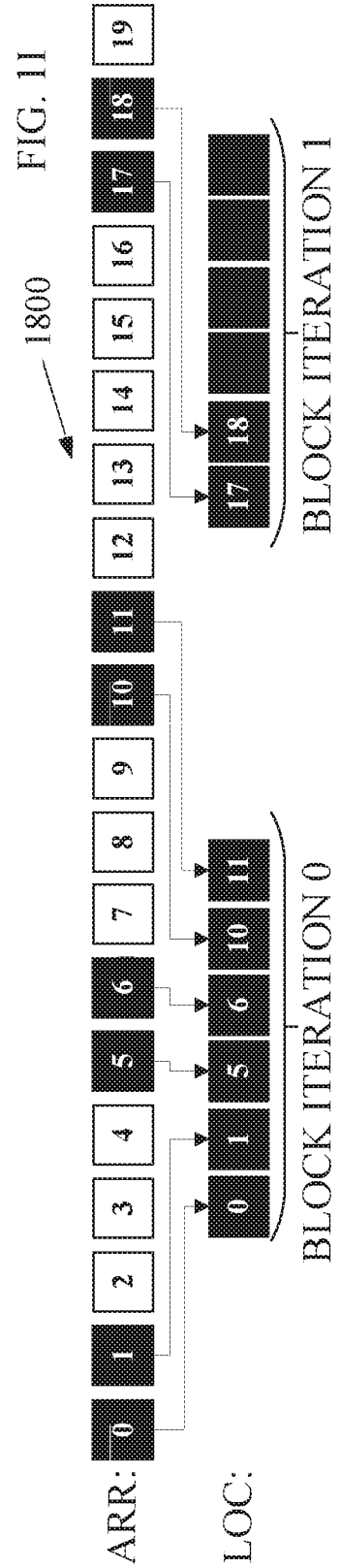

PSEUDO-CODE FOR CODE TRANSFORMATION          1800

```
IterSpace par_is(P, Oₚ, PUPₚ);  // Determine iteration spaces
IterSpace is(P, S, Oₚ, PUPₚ, Oₛ, SUPₛ);
ArrIndFunc fA¹(P, S, aₚ, c¹ₚ, b¹ₛ, d¹, &is);  // array index function of array A (K array accesses);
...
ArrIndFunc fAᴷ(P, S, aₚ, cᴷₚ, bᴷₛ, dᴷ, &is);
ArrIndFunc fB¹(P, S, xₚ, y¹ₚ, z¹ₛ, w¹, &is); // array index function of array B (N array accesses);
...
ArrIndFunc fBᴺ(P, S, xₚ, yᴺₚ, zᴺₛ, wᴺ, &is);
ArrayAccesses accA(&fAₖ);  // access grouping objects, 1 per array
ArrayAccesses accB(&fBₙ);
LoopNestDataAccess nest(&accA, &accB);  // top-level object holding all needed information
VectorP par_is_chunkₚ = nest.partition(get_available_memory());  // Call runtime library to split the P-dim parallel
                                                                    loop nest into chunks – size of the chunk
VectorP n_chunksₚ = (PUPₚ + par_is_chunkₚ - 1ₚ) / par_is_chunkₚ;  // Calculate iteration space blocks –number of
                                                                       chunks (P-dim)
int loc_size_Aₛ = nest.get_seq_window_size(A); // the max span of the seq. parts of all array index functions (per array)
int loc_size_Bₛ = nest.get_seq_window_size(B);
int adj_Aₛ = nest.get_seq_offset(A);
int adj_Bₛ = nest.get_seq_offset(B);           // adjustment of the seq. part of array index expression (per each array)
int loc_size_Aₚ = nest.get_par_window_size(A);
int loc_size_Bₚ = nest.get_par_window_size(B);  // the max span of the par. parts of all array index functions over the
                                                   above parallel chunk (per array)

for (int iiₚ; Oₚ .. n_chunksₚ - 1ₚ) {  // calculate lower and upper bound of the blocked parallel loop nest
  VectorP loₚ = par_is_chunkₚ * iiₚ;
  VectorP upₚ = minₚ(PUPₚ, loₚ + par_is_chunkₚ);
  int locA[[loc_size_Aₚ]][loc_size_Aₛ];  // allocate array memory windows on the constrained memory
  int locB[[loc_size_Bₚ]][loc_size_Bₛ];             (device specific allocation/de-allocation functions are used)
  VectorP adjAₚ = nest.get_par_offsets(A, iiₚ);  //Call Runtime Library to calculate array index expression adjustments
  VectorP adjBₚ = nest.get_par_offsets(B, iiₚ);          for each array (for the parallel dimensions of the expressions)
  locA[[:]][:] = A[[adjAₚ:loc_size_Aₚ]][adj_Aₛ:loc_size_Aₛ];  // Copy data from host arrays over to the local windows
  locB[[:]][:] = A[[adjBₚ:loc_size_Bₚ]][adj_Bₛ:loc_size_Bₛ];

for (int iₚ; loₚ .. upₚ - 1ₚ) {                   // this is the original loop nest adjusted for blocking
    ...
    for (int jₛ; Oₛ .. SUPₛ - 1ₛ) {
      ...
      locAᵏ[[aₚ*iₚ + cᵏₚ - adjAₚ]][dp(bᵏₛ,jₛ) + dᵏ - adjAₛ]
      ...                                            // Transform the array accesses – the
      locBⁿ[[xₚ*iₚ + yⁿₚ - adjBₚ]][dp(zⁿₛ,jₛ) + wⁿ - adjBₛ]   memory access instructions for the arrays
      ...
    }
    ...
  }
  A[[adjAₚ:loc_size_Aₚ]][adj_Aₛ:loc_size_Aₛ] = locA[[:]][:];// Copy back to host memory - put the calculated result
  A[[adjBₚ:loc_size_Bₚ]][adj_Bₛ:loc_size_Bₛ] = locB[[:]][:];     back to host arrays from the local windows
}
```

FIG. 1J

PSEUDO-CODE FOR TO DETERMINE BLOCK SIZES FOR
DATA LAYOUT TRANSFORMATION ⟵ 1900

```
INPUT : Loop nest
OUTPUT: Set of block-size ranges for each dimension foreach memory_access in loop_nest // get a set of coefficients from address expression
    coeffs = gather coeffs from memory_access // set of { [a0:0], [a1:1], ... [an:n] }

// reorder elements in increasing order so that value of coefficient at position n
    // in sorted sequence is less than or equal to value of coefficient at
    // position n+1.
    sort coeffs in ascending order by value of coefficients // initialize all block ranges with max interval
        block[0..N-1] = interval(1, MAX)

foreach coefficient in coeffs except last
        upper_bound = MAX
        curr_coeff_dim = get dimension index from current coefficient
        curr_coeff_val = get value from current coefficient if curr_coeff_val is not zero
            next_coeff_val = get value from next coefficient
            upper_bound = next_coeff_val/curr_coeff_val // intersect ranges of current interval and ranges calculated
        // for the same dimensions from other memory accesses
            block[curr_coeff_dim] = intersection of block[curr_coeff_dim]
                        and interval(1, upper_bound)
```

FIG. 1K

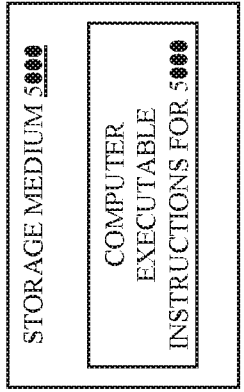
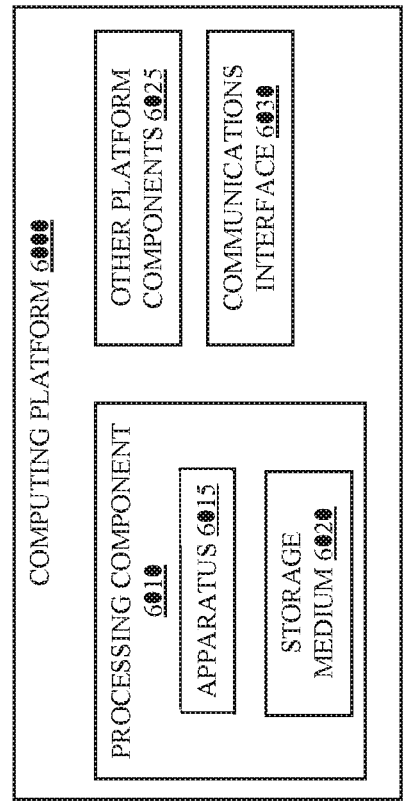

COMPILER TRANSFORMATION WITH LOOP AND DATA PARTITIONING

TECHNICAL FIELD

Embodiments described herein are in the field of the compilers. More particularly, the embodiments relate to methods and arrangements to determine code and/or data layout transformations during ahead-of-time compilations and/or just-in-time-compilations to partition data access by a task to facilitate use of a memory-constrained resource.

BACKGROUND

A compiler transforms a source code written in one language, such as C or C++ or Fortran, into a compiled code, expressed in another language, such as assembly code, machine code, or a higher-level code, that is executable by specific hardware. Compilers typically transform the source code in stages such as an analysis stage and a synthesis stage. The analysis stage may generate an intermediate representation of the source code to make the resulting code easier to synthesize. The synthesis stage may perform tasks such as code optimization to increase the speed and/or efficiency of the compiled code and code generation to generate the compiled code.

There are various high-level and low-level strategies for optimizing target code. High-level optimizations may involve machine-independent, programming operations. Low-level optimizations may involve machine-dependent transformations such as optimizations involving task offloading. However, existing solutions are not efficient. For example, some existing solutions are not efficient in cases when the data processing code runs on a separate device(s) with its own smaller memory where processed arrays do not fit entirely.

BRIEF DESCRIPTION OF THE DRAWINGS

FIGS. 1B-C depict embodiments of target code that is transformed to offload to a target device, such as the target device illustrated in FIG. 1A;

FIGS. 1D-F depict embodiments for one-dimensional partitioning and two-dimensional data partitioning by compiler logic circuitry such as the compiler logic circuitry shown in FIG. 1A;

FIGS. 1H-I depict embodiments of data layout transformation including data transfer compression by compiler logic circuitry such as the compiler logic circuitry shown in FIG. 1A;

FIGS. 1J-K depict embodiments of pseudo-code for code transformation by compiler logic circuitry such as the compiler logic circuitry shown in FIG. 1A;

FIGS. 5-6 depict embodiments of a storage medium and a computing platform.

DETAILED DESCRIPTION OF EMBODIMENTS

Figure 1A:
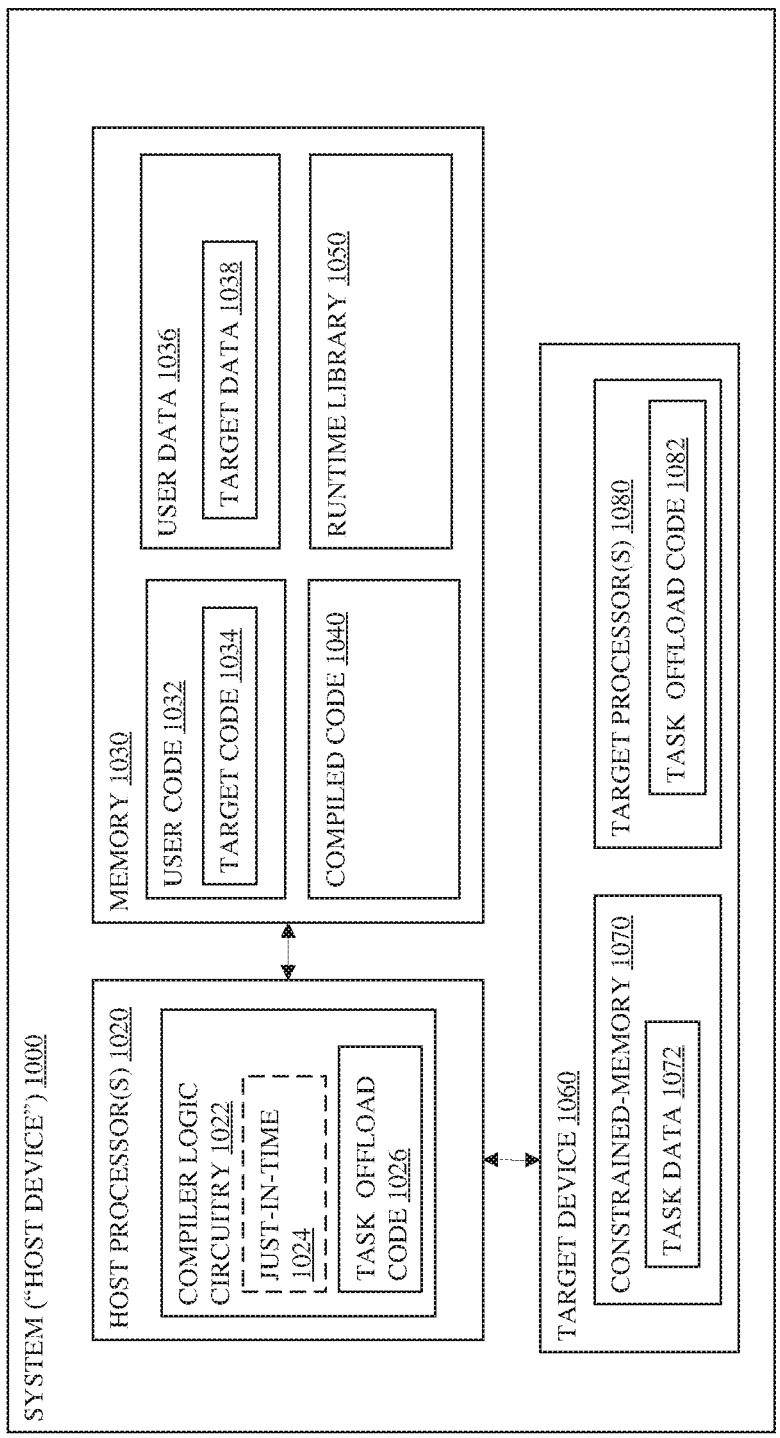
FIG. 1A depicts an embodiment of a system including a host device, memory, and a target device.

The following is a detailed description of embodiments depicted in the drawings. The detailed description covers all modifications, equivalents, and alternatives falling within the appended claims.

Some platforms, such as a Field Programmable Gate Array (FPGA)-based system, have a very limited amount of memory that can be accessed by all the compute cores of the platform—typically not more than 256K (kilobytes). Other platforms have a limited amount of memory with some specific characteristics like Shared Local Memory in Intel HD graphics, which is 128K maximum. For various reasons, it may be desirable to offload tasks to such memory-constrained devices. The following discussions reference these memory-constrained devices as target devices, the offload tasks as target code, and transformed target code as offload task code.

To efficiently execute target code in a target device, the host device transfers the all the data required to perform the task into the available memory in the target device such as the 128K or 256K of memory. For situations in which the data does not fit in the memory, the host device does not offload the target code or returns an error. Alternatively, a programmer can estimate memory usage of the target code and manually modify the target code to accommodate limitations of the target device. Furthermore, the amount of memory available for the target device to store data can vary between platforms and can vary at runtime based on, e.g., variables associated with execution of a task that are only known during execution of the task.

A programmer may identify target code by inclusion a tag or marker in the target code. In some embodiments, an application programming interface (API) may identify the tag or marker (e.g., # pragma omp target) as an instruction to offload a task to a target device. Many embodiments described herein refer to the OpenMP (Open Multi-Processing) Application Programming Interface, OpenMP Architecture Review Board, version 4.5, November 2015. OpenMP is an API that supports multi-platform shared memory multiprocessing programming in C, C++, and Fortran, on most platforms, instruction set architectures and operating systems, including Solaris, AIX, HP-UX, Linux, macOS, and Windows. Other embodiments may use other tags or markers and/or other API's to identify target code to a compiler.

Generally speaking, methods and arrangements to transform code are contemplated. Embodiments may identify target code to offload to a target device and may automatically and/or autonomously generate instructions to determine one or more partitions, or blocks, for at least one parallel loop in the target code to partition data elements, accessed via one or more memory access instructions within the at least one loop, based on a memory constraint of the target device. The memory constraint may identify an amount of memory available for allocation to process the target code.

Many embodiments determine code and/or data layout transformations during ahead-of-time compilations and/or just-in-time-compilations to partition data elements accessed by one or more memory access instructions for one or more arrays in the target code to facilitate use of a memory-constrained resource such as a local or remote, target device. Several embodiments perform compiler transformations coupled with a runtime library to implement automatic, multi-dimensional loop and data partitioning optionally coupled with affine data transformation to (1)

enable automatic offload of parallel loops to memory-constrained, target devices and to (2) speed-up memory-bound workloads on devices with limited faster local memory. In some embodiments, the compiler may automatically generate all needed code to transform and copy data to/from a target device and/or a faster local memory.

In several embodiments, the target device can perform parallel computations via multiple processors or processor cores. For instance, a host device may comprise an Atom-based processor platform coupled with an FPGA-based target device and may offload tasks for parallel processing on the FPGA-based target device.

Many embodiments begin with execution or compilation of a user code by a host compiler or device. For embodiments in which an ahead-of-time compiler compiles the user code, embodiments can automatically and/or autonomously perform code transformation to partition data accessed by the target code based on an estimation of memory usage by the target code and an estimation of memory available for the target code. Some embodiments that comprise a just-in-time compiler may partition data accessed by the offloaded tasks based on an amount of memory available for usage by the target code and the amount of memory that the target code will access.

For the discussions herein, an iteration space block (also referred to as an iteration space chunk, chunk, or iteration space partition) is a portion of one or more loops or loop nests that process concurrently, in parallel, during the execution of a transformed target code, or offload task code. A memory window is an allocation of the constrained memory that stores all data accessed by the iteration space block throughout the duration. A duration is the execution window of an iteration space block of the parallel loop nest in the target code. And an array span is an area inside of an array accessed by a particular parallel iteration or chunk of parallel iterations. In other words, a span is all elements from the lowest index to the highest index accessed by a particular duration or chunk of durations. The span can be multi-dimensional, in which case elements of the multi-dimensional array constituting the span are those whose indices are between the lowest and highest array indices calculated based on iteration space block's lowest and highest induction variable value and array index expression involving the induction variable in each dimension.

Several embodiments also automatically and/or autonomously employ a data layout transformation to more efficiently use the available memory. In many embodiments, the data layout transformation comprises instructions that execute at runtime (during execution by the target code) to more effectively use available memory.

For the following discussions and code examples, vector entities that consist of multiple components are written the same way as a scalar value but using a bold italic font and subscript (when present) denoting the number of components. Binary arithmetic operations (+−*/) on two vectors values produce a vector where the operation is applied on each component separately. And the dp operation is a dot product resulting in a scalar. Examples of such vector entities are: vector of loop index variables, vector of coefficients at loop index variables in an array access expression, a set of array index functions at each dimension of a multi-dimensional array access.

The notation of a loop nest over index variables $i1 \ldots iN$:
for (int i1=0; i1<up1; i1++) { ...
  for (int iN=0; iN<upN; iN++) { ... } ... }
is collapsed to
for (int $i_N$: $0_N \ldots UP_N$) { ... } where iN is a vector of length N of loop nest index variables <i1, ... iN>, $0_N$ is a vector of zeroes, $UP_N$ is a vector of loop nest upper bounds. N can be omitted if the length of the vector is clear from the context.

Multi-dimensional array access expression arr[c1*i1+d1] ... [cN*iN+dN] is collapsed to arr[[$c_N$*$i_N$+$d_N$]].

Furthermore, a span of an array over a parallel iteration space block, or chunk, is a minimal parallelepiped in the n-dimensional array index space such that an (n-dimensional) array index calculated for any of the iteration space point from within the chunk belongs to the span.

Various embodiments may be designed to address different technical problems related to memory-constrained resources such as executing code that accesses data that fits in the limited amount of memory available to process a task. Other technical problems may include identifying a task to offload; generating instructions for target code that access data that fits in the limited amount of memory available to process a task; adapting target code to access data that can be copied into the limited amount of memory available to execute the target code; determining the amount of memory available for processing the target code; copying data into memory-constrained resource that will not be accessed by the target code; and/or the like.

Different technical problems such as those discussed above may be addressed by one or more different embodiments. For instance, some embodiments that address problems associated with memory-constrained resources may do so by one or more different technical means, such as, identifying a tag in the code to identify a task, wherein the task comprises at least one loop, the loop to process data elements in one or more arrays; automatically generating instructions to determine one or more partitions for the at least one loop to partition data elements, accessed by the one or more memory access instructions for the one or more arrays within the at least one loop, based on a memory constraint, the memory constraint to identify an amount of memory available for allocation to process the task; determining the memory constraint based on the amount of memory available to process the task at runtime; determining the memory constraint based on an estimate of the amount of memory available to process the task; generating instructions to determine one or more partitions for outer loops of the task, wherein the one or more outer loops comprise parallel loops; determining one or more iteration space blocks for the parallel loops to be partitioned, each iteration space block to identify a subset of the data elements to be processed by a partition of the one or more arrays; determining non-overlapping subsets of the data elements for the one or more iteration space blocks; determining a memory window for each of the iteration space chunks, wherein the memory window comprises a portion of the amount of memory available for allocation to process the task for a span of all accessed arrays, wherein the span is all the data elements in the one or more arrays that is accessed by a duration of the iteration space block; determining non-overlapping spans for the memory windows; determining one or more partitions for serial loops of an outer loop of the task; determining one or more partitions an outer loop of the task; inserting instructions to call a runtime library to calculate iteration space blocks of one or more outer loops; inserting instructions to call a runtime library to calculate memory windows for one or more outer loops; partitioning one or more nested outer parallel loops; inserting instructions to copy data elements from a host device prior to execution of a iteration space block of the task and to the host device after completion of the iteration space block of the task, wherein the iteration space block of the task comprises a duration of the task during which memory access instructions access data elements in a memory window associated with the iteration space block; inserting instructions to perform a data layout transformation while copying the data elements from the host device, data transfer compression to selectively copy only the data that is accessed during execution of the iteration space block of the task; transposing data elements to reduce a stride of memory accesses; collapsing at least one loop to reduce a number of serial loops in a loop nest, wherein the at least one loop comprises a loop nest, and the like.

Several embodiments comprise systems with multiple processor cores such as central servers, access points, and/or stations (STAs) such as modems, routers, switches, servers, workstations, netbooks, mobile devices (Laptop, Smart Phone, Tablet, and the like), sensors, meters, controls, instruments, monitors, home or office appliances, Internet of Things (IoT) gear (watches, glasses, headphones, and the like), and the like. Some embodiments may provide, e.g., indoor and/or outdoor "smart" grid and sensor services. In various embodiments, these devices relate to specific applications such as healthcare, home, commercial office and retail, security, and industrial automation and monitoring applications, as well as vehicle applications (automobiles, self-driving vehicles, airplanes, and the like), and the like.

Turning now to the drawings, FIG. 1 illustrates an embodiment of a system 1000. The system 1000 is a host device such as a computer with a host processor(s) 1020, a memory 1030, and a target device 1060. One or more buses and/or point-to-point communication links may interconnect the host processor(s) 1020, memory 1030, and target device 1060. In some embodiments, the system 1000 may comprise a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Further embodiments implement larger scale server configurations. Note that the term "processor" refers to a processor with a single core or a processor package with multiple processor cores.

As shown in FIG. 1, the host processor(s) 1020 may comprise one or more processors and may couple with the memory 1030 to execute a compiler logic circuitry 1022. The compiler logic circuitry 1022 may be circuitry of the processor that performs functionality of a compiler via a state machine, hard coded logic, and/or execution of compiler code. In some embodiments, the compiler logic circuitry 1022 performs ahead-of-time compilations and, in other embodiments, the compiler logic circuitry 1022 performs just-in-time compilation 1024.

The host processor(s) 1020 may execute a compiled code 1040 that is an executable version of the user code 1032 in the memory 1030. The user code 1034 may comprise one or more instances of target code 1034 that is marked with a tag such as # pragma omp target to identify the target code as code to offload to the target device 1060. In some embodiments, the target code 1034 may also include one or more tags such as "# pragma omp parallel for" to indicate a loop to execute in parallel with one or more other loops.

The host processor(s) 1020 may compile the user code 1032 with the compiler logic circuitry 1022 to create the compiled code 1040 for execution by the host processor(s) 1020 and the target device 1060. Compilation may involve an analysis stage in which the code is analyzed and transformed into an intermediate code that assigns user data 1036 to registers of the host processor(s) 1020 for execution and identifies target code 1034 within the user code 1032 to be compiled for execution on the target device 1060. The analysis stage may associate one or more arrays of data in each loop or loop nest of the target code 1034 with the target data 1038 in the memory 1030. The compiler logic circuitry 1022 may insert copy instructions in the target code 1034 to copy the target data 1038 to the constrained-memory 1070 of the target device 1060.

In the present embodiment, the compiler logic circuitry 1022 may automatically and/or autonomously generate instructions that transform the target code 1034 and/or the data layout of the target data 1038 that is copied to the constrained memory 1070 to and from task data 1072 in the target device 1060. In other embodiments, the compiler logic circuitry 1022 may generate instructions that transform the target code 1034 and/or the data layout of the target data 1038 based on a preference, default setting, or input from a user.

In many embodiments, the compiler logic circuitry 1022 may couple with a runtime library 1050 to implement an automatic, n-dimensional loop and data partitioning, where n is the depth of the parallel part of the loop nest. In such embodiments, the compiler logic circuitry 1022 may insert instructions to call the runtime library 1050 to calculate partitioning parameters including the iterations space blocks of each loop in the outermost nest and the memory window sizes. The iteration space blocks of each outer loop and array index expressions determine the data elements that an array access expression in each of the outer loop accesses to perform a process of the loop nest. Note that examples described herein focus on the accesses of data by loop nests and not the particular process that the loop nests perform because embodiments partition the accesses to data elements so that all the data elements required by a chunk of the task offload code 1082 fit within the available memory for the task data 1072 in the constrained memory 1070. In other embodiments, the compiler logic circuitry 1022 may generate or insert code to perform the runtime library function.

After inserting one or more calls to the runtime library 1050 to determine the partitioning parameters, the compiler logic circuitry 1022 may block, or partition, the loop nest to create, e.g., 2*n loops instead of n, by adding 1 additional loop for each parallel loop in the outermost loop nest of depth n. The result is two loop nests of depth n, one (inner) nested within the other (outer). Then the compiler 1022 selects loop strides for the outer loop nest and loop bounds for the inner loop nest so that the span of the data accessed by the inner loop nest fits within the constrained memory.

After blocking the loop nest to create 2*n loops, create local n-dimensional "windows" allocated in the constrained memory for accessed arrays. For instance, the one-dimensional (1-D) partitioning illustrated in FIG. 1B creates one memory window for the task data 1072 in the constrained memory 1072 and is referred to as 1-D because the compiler logic circuitry 1022 only modifies the target code for an outer loop nest. For two-dimensional (2-D) partitioning, such as the embodiment illustrated in FIG. 1C, the compiler logic circuitry 1022 may create one two-dimensional memory window allocated in the constrained memory 1070. Note that many embodiments generate partitions for any number of dimensions and are not limited to 1-D or 2-D partitioning.

After creating the memory windows, the compiler logic circuitry 1022 may insert instructions in the task offload 1026 to copy data elements from the original arrays, arr, to the local arrays, loc, in their respective memory windows before computations and copy the processed data elements back to the original arrays, an, in the target data 1038 in the host memory after computations for each iteration of the new outer loop. In several embodiments, while copying data elements from the original arrays, the compiler logic circuitry 1022 may optionally transform the data layout to reduce the amount of copied data (number of data elements) and/or improve memory access patterns within the loop nest. For instance, if the array indices within the loop nest only access odd numbered indices, the loop nest only utilizes half of the, e.g., 16 data elements. The compiler logic circuitry 1022 can insert instructions to copy only the odd indices of the array an into the local array loc to fall within the 8 data element memory constraint. Note that the task offload code 1026 represents a copy of the target code 1038 that is being modified or transformed by the compiler logic circuitry 1022.

Once the compiler logic circuitry 1022 inserts the copy instructions, the compiler logic circuitry may transform the array accesses within the inner loop nest to change the base address from the original array to its corresponding window and update array index expressions.

FIG. 1B depicts an embodiment of transforming target code 1110 to a task offload code 1120 to offload to a target device, such as the target code 1034, the task offload 1026, and the target device 1060 illustrated in FIG. 1A. The target code 1110 depicts one parallel loop nest that includes the tag "# pragma omp target parallel for" to identify a thread for parallel processing. The outer loop is the first loop "for (i=0; i<4, i++) . . . ." The second (serial or nested) loop is "for (j=0; j<4; j++)" and the array of elements accessed by the loop nest is array r "arr[4*i+j]". This example is in C++ programming language but other embodiments can be in any programming language.

For the purposes of this embodiment, we assume that the number of actual or estimated data elements that can fit in the task data 1072 of the constrained memory 1070 (the memory constraint) is 8 data elements and the array r (an) includes 16 data elements. Thus, the compiler logic circuitry 1022 may insert runtime library calls to calculate partitioning parameters such as the actual or estimated memory constraint, the number of iteration space blocks, or chunks, in the new outer loop for ii (par_is_chunk$_p$), the span W of the local array loc (also referred to as loc_size_xxx$_p$), and the index offset s (also referred to as adjxxx$_p$) to block or partition the outer loop of the loop nest into more than one chunks. Note that xxx represents an identifier for the specific array and may include a number, a character, or an alphanumeric string.

Based on analysis of the target code 1110 and actual or estimated array r data, the compiler logic circuitry 1022 may determine to divide the outer loop into X chunks to divide the data accessed by this loop by X. In this example, the compiler logic circuitry 1022 divides the outer loop into 2 chunks, which effectively divides data accesses by 2. Based on analysis of the target code 1110, the compiler logic circuitry 1022 may determine the number of dimensions of the partitioning as well as whether to further partition one or more nested loops of the loop nest or perform a data layout transformation. In the present embodiment, the compiler logic circuitry 1022 divides or partitions the loop nest "for (i=0; i<4, i++) . . . " in the target code 1110 into iteration space blocks including a first loop nest "for (ii=0; ii<2, ii++) . . . " and a second loop nest "for (i=ii*2; i<(ii+1)*2, ii++) . . . " in the task offload 1120. The compiler logic circuitry 1022 may also insert code to get the value of 2 for par_is_chunk$_p$ from the runtime library for the loop nest in the target code 1110.

The target code 1110 initializes the array r, (an) to 16 elements in the statement "int arr[16]". The statement "const int W=8" initializes a constant W to equal the memory constraint of 8 data elements because, in the present embodiment, the compiler logic circuitry 1022 is partitioning one loop nest. The statement "int loc[W]" allocates the memory window in an array loc of 8 data elements in the task data 1072 of the constrained memory 1070. The array an is the array of data elements located in the memory 1030 of the host device and the array loc is the array that will receive target data 1038 from the memory 1030 in the constrained memory 1070.

Note that FIGS. 1B and 1C *do not* resemble actual code. They illustrate a concept of data blocking. In practice, for example, 'const int W=8' *may* look like 'const int W=get_span_for_array(arr, . . . );'. Furthermore, the example set W=8 not only because 8 is the constrained memory size, but also because a runtime library function calculated 8 to be the window size for arr. In other embodiments, it could be any number that fits into the constraints, such as 6.

The statement "loc[:]=arr[s:W]" copies W data elements into the loc array from the target data 1038 starting with the array element s, which is a variable value that has the value of 0 when ii=0 and has the value of 8 when ii=1.

This new outer loop, which establishes the space iteration blocks, causes target device 1060 to perform the new loop nest "for (i=ii*2; i<(ii+1)*2; ii++)" to process twice. The statement "int s=ii*W" is within the outer for loop of ii=0; ii<2; ii++, which starts with ii equal to zero, increments ii to equal one, and ends with ii equal to one. Thus, s=0 while processing the first chunk and s=8 while processing the second chunk. In other words, the compiler logic circuitry 1022 divides the original loop nest into two chunks, the first chunk being from i=0 to i=1 and the second chunk from i=2 to i=3 by creating a new outer loop that splits the loop nest into two chunks with a span of W data elements and an index offset of s.

The compiler logic circuitry 1022 generates new or modified instructions for loading data elements into the array loc by generating a second instruction for the original outer loop that only increments through half (or $1/n^{th}$ where n=2) of the array indices and generating a new array instruction "loc[4*i+j−s]" that transforms array accesses by modifying the indices of the data loaded from the target data 1038 in the memory 1030 and into the task data 1072 of the constrained-memory 1070. Note that n does not correspond to the number of resulting loops. n is the number of the original i's iteration space blocks (or chunks), which is 4/(chunk_size).

After dividing the outside loop by 2, each of the iterations of the parallel for loop in the task offload 1120 will load 8 data elements at the indices from the array r of the memory 1030 into the local array loc of the constrained memory 1070 to perform the loop nest processing. The code transformation illustrated in FIG. 1B is referred to as one-dimensional (1-D) partitioning because the compiler logic circuitry 1022 is only dividing iteration space of the single outermost parallel loop into more than one partitions or chunks.

FIG. 1C depicts another embodiment of transforming target code 1210 to a task offload code 1220 to offload to a target device, such as the target code 1034, the task offload code 1026, and the target device 1060 illustrated in FIG. 1A. In this embodiment, the compiler logic circuitry 1022 determines to partition two parallel loops, the outer parallel loop and the nested parallel loop, which is 2-D partitioning. The value of par_is_chunk$_p$ (both Ei and Ej) is 2, a value of loc_size_arrayi$_p$ (Li) is 1*Ei, a value of loc_size_arrayj$_p$ (Lj) is 1*Ej, a value of adjarrayi$_p$ (si) is ii*Ei*1, and a value of adjarrayj$_p$ (sj) is ii*Ej*1. Note that arrayi and arrayj replace xxx for the first and second parallel loop nests respectively.

The compiler logic circuitry 1022 may determine that a 1-D partitioning for the code transformation for the target code 1210 will not meet the memory constraint based on analysis of the target code 1210. For instance, the span 1300 for each index i of the outer loop is illustrated in FIG. 1D. FIG. 1D illustrates the span 1300 of data elements accessed in the array i for each index i (i=0 through i=3) of the outer parallel loop for 1-D partitioning in the target code 1210. Even though the loop for i=0 accesses only 4 data elements, which is denoted by the x's, the values of i=0, 4, 8, and 12 span 13 data elements in the array. The 13 data elements exceed the memory constraint of 8 data elements, which is assumed for illustrative purposes, even if the compiler logic circuitry 1022 partitions the outer loop into 4 chunks, one for each index value for i. Thus, the compiler logic circuitry 1022 may determine to apply 2-D partitioning. Note that, the compiler logic circuitry 1022 may also, or alternatively, apply data layout transformation to copy only the actual data elements accessed, which changes the span of the loc array for each iteration of i to 4 data elements but this will be discussed in later examples.

For 2-D partitioning, the compiler logic circuitry 1022 may first delinearize the array expression of arr[4*j+i] to be arr[i][j]. In other words, the compiler logic circuitry 1022 may change the array access from linear access that progresses through rows and columns or vice versa of the data in the original array in the memory 1030 to non-linear access based on coordinates or vectors of column and row values [i] and [j]. De-linearization, however, is not always possible. Its success depends on the actual linear array index expression and the bounds of loop indices participating in the expression. But it is possible in many practical cases.

The complier logic circuitry 1022 may insert instructions to partition each parallel loop nest by par_is_chunk$_p$ and to determine iteration space blocks 1400, or "chunks", as illustrated in FIG. 1C. Note that the compiler logic circuitry 1022 can determine chunks for the target code 1210 in which the chunks do not overlap. Similarly, the compiler logic circuitry 1022 may determine memory windows in the constrained memory 1070 for data space partitioning such as the 2-D data space partitioning 1500 illustrated in FIG. 1E and verify that the spans of the chunks have non-overlapping memory windows. In other words, the compiler logic circuitry 1022 may verify that the four chunks do not access the overlapping memory windows or load the data from overlapping memory windows into the loc for processing by more than one of the chunks because that could produce invalid results.

After determining the iteration spaces and memory windows, the compiler logic circuitry 1022 may insert instructions to call to the runtime library to determine the partitioning parameters such as the Ei, Ej, Li, Lj, si, and sj. The compiler logic circuitry 1022 may generate instructions including two new outer loops, enclosing the modified versions of the original two parallel loops representing splitting of the original 2D iteration space over i and j index variables into 2D (Ei,Ej) chunks of Ei iterations along i dimension and Ej iterations along j dimension. 4/Ei and 4/Ej represent the number of chunks along each dimension. The compiler logic circuitry 1022 may allocate the array windows allocated in the constrained memory 1070 with the statement "int loc[Li][Lj]" and the compiler logic circuitry 1022 may insert instructions to copy data elements in the original array in the memory 1030 to the constrained memory 1070 in the target device 1060 with the statement "loc[:][:]=arr[si:Li][sj:Lj]" prior to computations and back to the memory 1030 after the computations with the statement "arr[si:Li][sj:Lj]=loc[:][:]". Note that the compiler logic circuitry 1022 may also apply data layout transformation in the copy instructions or code. Note that 'loc[:][:]=arr[si:Li][sj:Lj]' is a condensed notation for 'for (int i=0; i<Li; i++) for (int j=0; j<Lj; j++) loc[i][j]=arr[si+i][sj+j];'.

After inserting code to copy the original array to the local array, the compiler logic circuitry 1022 may generate instructions to transform array accesses. For instance, the compiler logic circuitry 1022 may transform the outer parallel loop from "for (i=0; i<4; i++)" to "for (i=ii*Ei; i<(ii+1)*Ei; i++)" and transform the nested parallel loop from "for (j=0; j<4; j++)" to "for (j=jj*Ej; j<(jj+1)*Ej; j++)". The compiler logic circuitry 1022 may also initialize si to equal "ii*Ei*1" and sj to equal jj*Ej*1. Furthermore, the compiler logic circuitry 1022 may add offsets to the local window array access "loc[i-si][j-sj]" to process the local array in the constrained memory.

Figure 1G:
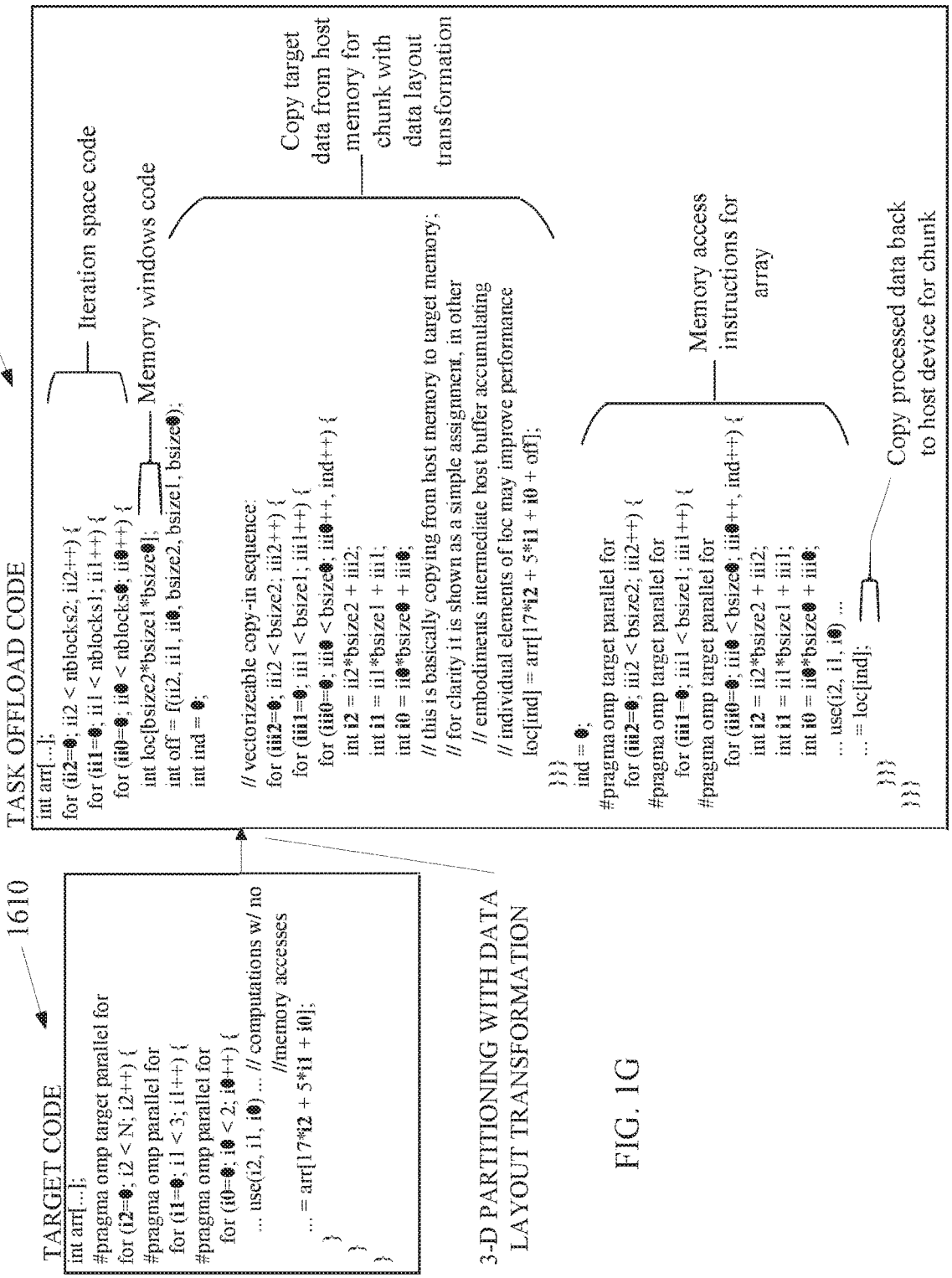
FIG. 1G depicts another embodiment of target code that is transformed to offload to a target device, such as the target device illustrated in FIG. 1A.

FIG. 1G depicts an embodiment of transforming target code 1610 to a task offload code 1620 to offload to a target device, such as the target code 1034, the task offload 1026, and the target device 1060 illustrated in FIG. 1A. FIG. 1G shows a target code 1610 that the compiler logic circuitry 1022 transforms into the task offload code 1620 using three-dimensional (3-D) partitioning along with data layout transformation in the form of data compression.

The compiler logic circuitry 1022 may generate the pseudo-code for the task offload code 1620 based on bsize0(1,2) and nblocks0(1,2), which describe the block size and the number of blocks (partitions) for a loop with index variable i0(1,2). The compiler logic circuitry 1022 may calculate the values for bsize0(1,2) and nblocks0(1,2) based on various factors, such as coefficients in array index expressions, and an algorithm such as the embodiment of the pseudo-code 1900 for finding the block sizes illustrated in FIG. 1K.

As it can be seen, the copy-in sequence, marked as the "vectorizable copy-in sequence" in the task offload code 1620, is a per-element copy of the accessed elements from arr to loc. Even though it seems not very efficient at first glance, in many cases, this compression of the data elements during the copy of the data elements from arr to loc may be beneficial compared to the uncompressed copying. For instance, uncompressed copying copies data in big chunks, but it copies lots of unused data, which wastes the memory bandwidth. On the other hand, the compressed copying loop nest is vectorizable and can show good performance on many platforms. In general, the compiler logic circuitry 1022 may use a cost model to see if compressed copying is efficient. For example, if an length is N and the number of accessed data elements is n, then higher n/N ratio likely means less profit from compression and vice versa.

For the sake of clarity, the illustration above does not have a nested serial loop nest, nor do the examples in further sections below. Nevertheless, data compression in presence of a nested serial loop nest can also be performed by using techniques presented in the various embodiments described herein. The major differences with no-nested-serial-loop-nest case are:

the gaps in array accesses induced by the serial part of array index expressions (linear combination of serial loop indices) will not be compressed, so overall copying may be less efficient, and the local memory windows of arrays will increase their size by the span of the arrays over the entire serial nest iteration space—this will affect calculation of the bsize0(1,2) so that memory windows still fit into the device memory.

the algorithm of block size calculation, described in conjunction with FIG. 1K, will change so that when sorting coefficients at loop indices in array index expressions, coefficients at parallel loop indices cannot be re-ordered with coefficients at serial loop indices; if this restriction makes it impossible to sort the coefficients as needed, then data compression may not be possible.

Furthermore, to maintain data consistency, copying data elements to target device and copying the data elements back should maintain one-to-one mapping of elements accessed on host device to corresponding elements on target device and one-to-one backward mapping.

FIGS. 1H-1I depict embodiments of data layout transformation including data transfer compression by compiler logic circuitry such as the compiler logic circuitry 1022 shown in FIG. 1A. FIG. 1H illustrates an embodiment 1700 of uncompressed copying from the array r (arr) in the memory 1030 to the local array (loc) in the constrained memory 1070. Each box of the boxes 1-19 are copied from the an to loc for processing chunks identified as block iteration 0 and block iteration 1. The solid black boxes such as 0, 1, 5, 6, 10, and 11 illustrate boxes that are actually accessed by these chunks of the loop nest. In other words, the array indices accessed are arr[17*i2+5*i1+i0] in accordance with the target code 1610 illustrated in FIG. 1G.

The target code 1610 only accesses about a half of the data elements. As discussed in conjunction with FIG. 1G, if the compiler logic circuitry 1022, in this embodiment, does not perform data layout transformation including data compression, the compiler logic circuitry 1022 inserts code in the task offload (not shown) to block copy the entire block of an from data element 0 to data element 5 for the block iteration 0 and from data element 6 through data element 11 for block iteration 1.

FIG. 1I illustrates an embodiment 1800 of compressed copying from the array r (an) in the memory 1030 to the local array (loc) in the constrained memory 1070 for the task offload code 1620 as discussed in FIGS. 1G-1H. The compiler logic circuitry 1022 may generate vectorizable instructions to copy data elements from the an to the loc (and back from loc to arr) with data compression to, advantageously, reduce the memory bandwidth associated with copying the data elements. The compiler logic circuitry 1022 copies each of the black boxes, 0, 1, 5, 6, 10, 11, 17, and 18 from the an to the loc for processing chunks identified as block iteration 0 and block iteration 1.

FIGS. 1J-K depict embodiments of data layout transformation including data transfer compression by compiler logic circuitry such as the compiler logic circuitry shown in FIG. 1A.

FIG. 1J illustrates an embodiment 1800 of pseudo-code for automatic and/or autonomous code transformation in conjunction with a runtime library such as the runtime library 1050 illustrated in FIG. 1A. The general form of the target code 1034 is shown below. It is a 'serial' loop nest (S loops) nested within the 'parallel' loop nest (P0 loops)—for a total of P0+S loops. Within the serial loop nest there is a P0+1-dimensional access to array arr. Each parallel dimension's index expression is a linear function of the corresponding loop index, the last dimension is all 'serial' dimensions collapsed into one, and the index expression is a linear function over all 'serial' loop indices. The compiler logic circuitry 1022 may employ existing techniques to first turn a multi-dimensional array access into a 1-D array access if needed (e.g. if the number of dimensions is not P0+1) and then 'de-linearize' and bring it to this form. The compiler logic circuitry 1022 might decide not to use all P0 available parallel loops for blocking so we define the number of blocked (partitioned) parallel loops to be P (which is <=P0). For example, in some cases, de-linearization is not possible and the array access remains 1-D in the form of $A[dp(c_{S'+1}, i_{S'+1})+d]$, where S' is S+P0−1, and P is 1.

The general form for the target code 1034 is:

for (int $i_P$: $0_P$ . . . $PUP_P-1_P$) { . . .
  for (int $j_S$: $0_S$ . . . $SUP_S-1_S$) { . . .
    $A^k[[a_P*i_P+c^k_P]][dp(b^k_S,js)+d^k]$ . . .
    $B^n[[x_P*i_P+y^n_P]][dp(z^n s,js)+w^n]$ . . . } . . . }

In the general form for the target code 1034:

k,n—denotes a sequential number of access to arrays A,B; different accesses may reside in a different place within the loop tree, in which case sequential loop indices will be different; if an array index expression does not depend on a particular loop index, its coefficient is considered to be zero.

$i_P$—a vector $(i_1, \ldots, i_P)$ of parallel loop indices.

$i_S$—a vector $(j_1, \ldots, j_S)$ of sequential loop indices.

$PUP_P$—a vector $(PUP_1, \ldots, PUP_P)$ of upper bounds of parallel loops.

$SUP_S$—a vector $(SUP_1, \ldots, SUP_S)$ of upper bounds of sequential loops.

For array A:

$a_P$—a vector $(a_1, \ldots, a_P)$ of coefficients at parallel indices, it is the same for all accesses.

$b^k_S$—a vector $(b^k_1, \ldots, b^k_S)$ of coefficients at sequential indices.

$c^k_P$—a vector $(c^k_1, \ldots, c^k_P)$ of addends in parallel index functions.

$d^k$—the addend of array index function in the last serial dimension.

For array B:

$x_P$—a vector $(x_1, \ldots, x_P)$ of coefficients at parallel indices, it is the same for all accesses.

$z^k_S$—a vector $(z^k_1, \ldots, z^k_S)$ of coefficients at sequential indices.

$y^k_P$—a vector $(y^k_1, \ldots, y^k_P)$ of addends in parallel index functions.

$w^k$—the addend of array index function in the last serial dimension.

The compiler logic circuitry 1022 may transform the general form for the target code by:

(1) Inserting a call to the runtime library 1050 to calculate partitioning parameters based on current values of PUP and other relevant parameters.

(2) Partitioning the loop nest by, e.g., wrapping the loop nest into another loop nest of depth P and inserting instructions to calculate a P-dimensional parallel iteration space block.

(3) For all accessed arrays, creating local P-dimensional memory windows allocated in the constrained memory 1070.

(4) Inserting data copying instructions between the original arrays and their memory windows in the constrained memory 1070 including:

from an original array in the memory 1030 to its memory window in the local array of the constrained memory 1070—before the beginning of the inner parallel loop nest.

from the memory window in the local array of the constrained memory 1070 to the original array in the memory 1030—after the end of the inner parallel loop nest.

if data layout transformation is considered profitable, the compiler logic circuitry 1022 may perform data layout transformation in the copying instructions.

(5) Transforming array accesses:

changing base address from the original array to its corresponding memory window in the local array in the constrained memory 1030.

updating array index expressions.

if data layout transformation is enabled, array index expression updating involves changing the addend part and also coefficients at loop indices.

Referring again to FIG. 1A, the memory 1030 may be portions of the main memory (e.g., a dynamic random-access memory (DRAM)) for a platform such as double data rate type 3 (DDR3) or type 4 (DDR4) synchronous DRAM (SDRAM), portions of a shared memory, portions of a hard drive, portions of a solid state drive, and/or the like and is locally attached and/or remote. In the present embodiment, the memory 1030 is locally attached to the host processor(s) 1020.

The memory 1030 may comprise the user code 1032. The compiler logic circuitry 1022 may compile the user code 1034 for execution on the host processor(s) 1020 to generate the compiled code 1040.

The user code 1032 may comprise the target code 1034 for execution on the target device 1060. The compiler logic circuitry 1022 may analyze the target code 1034 and compile the code with code transformation and optionally data layout transformation to generate a task offload 1026. Thereafter, the compiler logic circuitry 1022 may compile the offload task to a different language such as machine code or assembly language prior to offloading the code to the target device 1060 as task offload code 1082.

The memory 1030 may be memory in a host device, system 1000, and may comprise user data 1036 and the user data 1036 may include the target data 1038. The user data 1036 may comprise data elements that the user code 1032 accesses during execution. The target data 1038 may comprise the data elements accessed by the target code during execution such as the array r.

The memory 1030 may also comprise a runtime library 1050. The runtime library 1050 may comprise support to (1) store in memory 1030 the representation of the array index functions and iterations spaces constituting the blocked (partitioned) loop nest. The runtime library 1050 may also, (2) based on the information from (1) and the amount of the available constrained memory, calculate blocking characteristics and provide them to the code generated by the compiler logic circuitry 1022 upon request, such as:

par_is_chunk$_P$—the n-dimensional chunk of the parallel iteration space such that the span of all arrays over this chunk fits into the constrained memory.

loc_size_XXX$_P$— the span of the array XXX over par_is_chunk$_P$.

loc_size_XXX$_S$—the span of the array XXX over the sequential part of the loop nest; if this span is greater than the available memory, then blocking may fail.

adjXXX$_P$—a vector of adjustments of array index expressions in parallel dimensions for array XXX.

adjXXX$_S$—adjustment of the array index expression in the sequential dimension for array XXX.

The runtime library 1050 may calculate the adjustments adjXXX$_P$ and adjXXX$_S$ so that adjusted array access expressions applied to local windows of the original arrays fit into [0 . . . size], where size is the local window size along the corresponding dimension.

In several embodiments, the runtime library 1050 calculates these parameters as follows:

During a single iteration of the parallel part of the loop nest, sequential loop indices run from zero $0_S$ to their upper bounds $SUP_S-1_S$. Hence the minimal local window of an array accessed only once is the span of the array index function over the entire sequential iteration space. The sequential part of a k'th array index function of array A can be represented as:

$fA^k(js) = dp(b^k s_+, js_+) + dp(b^k s_-, js_-) + d^k$;

where s+ denotes a subset of 1 . . . s such that coefficients at corresponding loop indices in the array index expression are non-negative:

$b^k s_+ \geq 0$ and s− denotes a complimentary subset such that $b^k s_- < 0$.

Taking into account that all lower bounds are zero, then the minimum and maximum values of the function over the sequential iteration space are $$\min_{js} fA^k = dp(b^k s_-, SUP_{s-} - 1_{s-}) + d^k$$

$$\max_{js} fA^k = dp(b^k s_+, SUP_{s+} - 1_{s+}) + d^k$$

A global minimum and global maximum over all index functions of accesses to array A are:

$$\min fA = \min_k fA^k$$

$$\max fA = \max_k fA^k$$

the size of the sequential dimension of the A's local window is calculated as loc_size_A$_S$=max fA−min fA and the sequential adjustment of array index expressions is calculated as adjA$_S$=min fA The volume of the A's local window is:

V$_A$=loc_size_A$_1$*loc_size_A$_2$* . . . * loc_size_A$_P$* loc_size_A$_s$ where loc_size_A$_m$ is a combined span of m'th dimensions of index functions of all accesses to array A over par_is_chunk$_m$. All these functions have a form of $a_m * i_m + c^k_m$, so assuming $a_m \geq 0$ the combined span is:

$$\text{loc\_size\_A}_m = \\ \left(a_m * (i_m + \text{par\_is\_chunk}_m) + \max_k c^k_m\right) - \left(a_m * i_m + \min_k c^k_m\right) == \\ a_m * \text{par\_is\_chunk}_m + \left(\max_k c^k_m - \min_k c^k_m\right)$$

Various embodiments of the runtime library 1050 may choose any natural integer values of par_is_chunk$_i$ provided that:

V$_A$+V$_B$<=available_memory

In one embodiment, the runtime library 1050 may choose all of values of par_is_chunk$_i$ to be equal to 1. The adjustments of array index expressions in parallel dimensions are chosen so that the value of the expression is in the interval [0, loc_size_A$_i$], this is:

$$adjA_i = -\left(\min_k c_m^k\right);$$

Furthermore, if a$_m$<0, then the formulas may be slightly more complex.

Referring again to FIG. 1A, the target device 1060 may comprise a device such as a floating point gate array (FPGA) with multiple target processor(s) 1080 that can access the constrained-memory 1070. The target device 1060 may receive the task offload 1082 from the host processor(s) 1020 and execute the task offload 1082. Executing the task offload 1082 may include copying portions of the target data 1038 from the array in the memory 1030 to memory windows in a local array to process the target data 1072 for the user code 1032.

FIG. 1K depicts an embodiment of pseudo-code 1900 that may reside in the runtime library 1050 to determine block sizes for data layout transformation by compiler logic circuitry such as the compiler logic circuitry 1022 shown in FIG. 1A. Note that the "//" marks indicate comments to describe the pseudo-code 1900.

A prerequisite for implementing this pseudo-code 1900 is described in terms of linearized memory access form. It is assumed that every memory access is represented as base+offset, where offset is linear expression in a form $$\sum_{0}^{N-1} a_k * i_k$$

where i$_k$ is loop nest induction variable, a$_k$ is a coefficient, and N is loop nest depth. For the sake of simplicity coefficients are considered to be non-negative. The algorithm may be extended to handle negative coefficients. The loop nest is assumed to be perfect. The algorithm calculates a valid range of block-sizes for each dimension and the compiler is free to choose a block-size within this range based on other heuristics.

The pseudo-code 1900 begins with a loop for each memory access in a loop nest, perform the following actions. The runtime library 1050 may determine a set of coefficients from the address expression for the data elements in the memory 1030. The set of coefficients may form a tupple such as [a0:0], [a1:1], . . . [an:n]. Each coefficient may contain at least its value and the number of the dimension to which it belongs. For instance, in a loop nest with depth 2 and induction variables i and j for the dimensions 0 and 1, respectively. Memory C[a*i+b*j] refers to a set of 2 coefficients:

1: value is a, dimension is 0, or in short notation [a:0] or [a:i]
  2: value is b, dimension is 1, or in short notation [b:1] or [b:j]

After gathering the coefficients, the runtime library 1050 may reorder elements in increasing order so that value of coefficient at position n in the sorted sequence is less than or equal to value of coefficient at position n+1. For example, if a0>a2>a1, the sorted sequence for the set of coefficients is [a1:1], [a2:2], [a0:0].

Once the coefficients are sorted, the runtime library 1050 may initialize all the block ranges with a maximum interval. The interval is a pair of two numbers: a lower bound and an upper bound such that the lower bound <=upper bound. For the purpose of this embodiment only intervals which have lower bound >=0 are considered.

For each of the coefficients except for the last coefficient, set the upper bound equal to the maximum upper bound, set the current coefficient dimension to the dimension index of the current coefficient, and set the current coefficient value to the value of the current coefficient. If the current coefficient value is not zero, set the next coefficient value to the value of the next coefficient and set the upper bound to the value of the next coefficient divided by the value of the current coefficient.

Thereafter, the runtime library 1050 may determine the intersect ranges for the current interval and may calculate the ranges for the same dimensions from other memory accesses. The intersection of intervals x, y is a new interval constructed from:
lower bound=max(lower bound x, lower bound y) and
upper bound=min(upper bound x, upper bound y).

Below are a couple more examples of block sizes calculations:

For example 1, let's assume that the loop nest depth is 4 and contains the following address expressions:
  #1: A[17*i3+2*i2+5*i1+9*i0]
  #2: A[20*i3-3*i2+6*i1+8*i0]
  For memory access #1:
  sorted_coeffs={[2:i2],[5:i1],[9:i0],[17:i3] }
  block_range[2]=[1; 5/2]=[1; 2];
  block_range[1]=[1; 9/5]=[1; 1];
  block_range[0]=[1; 17/9]=[1; 1];
  block_range[3]=[1; MAX];
  For memory access #2:
  sorted_coeffs={[3:i2],[6:i1],[8:i0],[20:i3] }
  block_range[2]=[1; 6/3]=[1; 2] and intersect with previous [1, 2]=[1, 2];
  block_range[1]=[1; 8/6]=[1; 1] and intersect with previous [1, 1]=[1, 1];
  block_range[0]=[1; 20/8]=[1; 2] and intersect with previous [1, 1]=[1, 1];
  block_range[3]=[1; MAX] and intersect with previous [1; MAX]=[1; MAX];

For example 2, let's assume that the loop nest depth is 2 and contains the following address expressions:
  #1: A[100*i0+i1]
  #2: B[100*i0]
  For memory access #1:
  sorted_coeffs={[1:i1],[100:i0] }
  block_range[1]=[1; 100/1]=[1; 100];
  block_range[0]=[1; MAX];
  For memory access #2:
  sorted_coeffs={[0:i1],[100:i0] }
  block_range[1]=[1; MAX] and intersect with previous [1; 100]=[1; 100];
  block_range[0]=[1; MAX] and intersect with previous [1; MAX]=[1; MAX];

In several embodiments, the compiler logic circuitry may have restrictions related to input code. In one embodiment, the input to the compiler logic circuitry is a loop tree with arbitrary number of accesses to arbitrary number of arrays at arbitrary, non-parallel levels in the loop tree. P outer loops of the tree should form a perfect parallel loop nest:
  no other code can interleave between the loops, including situations where there are two loops at the same level.

iterations of the loop nest can be executed in any order; i.e., an iteration defined by <x1, . . . , xP> values of the $i_P$ loop index variables can be executed before or after another iteration <y1, . . . , yP> without affecting the result of computations.

In some of these embodiments, loops inside the parallel loop nest can have any nesting structure. The following further restrictions apply:
1. all array index functions must be linear over the loop indices
2. (1) loop bounds and (2) array access coefficients must be loop tree invariants
3. Given an array arr, a set of K accesses to this array of the form $arr^k[[a^k_P * i_P + c^k_P]][ \ldots ]$ (k=1 . . . K) and an outermost parallel loop nest of depth P, the following condition must hold:
$a^x_j = a^y_j$ for any x and y and for all j=(1 . . . P)
i.e., the coefficients at a parallel index should be the same in all accesses to the same array.
4. The spans of any accessed array over any two multi-dimensional parallel iterations should not overlap. In the 2D partitioning example in FIG. 1C, there is no nested serial loop and span is just one point in each 2D iteration. No two parallel iterations access the same memory locations and we can apply the 2D partitioning. But in case of 1-D partitioning applied to the 2D partitioning example in FIG. 1C, 1-D spans of array an over the outermost parallel loop do overlap. So even if the available device memory was 13 elements (enough to hold the entire span), 1-D partitioning would still not be possible due to the overlap. This is because, when there is overlap, copying the local window back to the array in the memory 1030 would overwrite elements calculated by different parallel iterations.

If nested parallel loops are not perfect or restriction 3 does not hold for all the parallel loops, the transformation considers P to be the biggest number L<P, such that all restrictions hold for the L outermost parallel loops.

Furthermore, the compiler logic circuitry and the runtime library may try to do multi-dimensional partitioning whenever possible, otherwise they revert to 1-D partitioning such as the embodiment shown in FIG. 1B. For the sake of clarity, the illustrated embodiments show two arrays, but partitioning can be done in case of any number of arrays and any number of accesses to each array.

Note that the notation arr[s:W] refers to a section of an with a starting index of s and a length of W. Similarly loc[:] refers to the section of loc array that covers all its elements.

Many embodiments describe example code for OpenMP but OpenMP currently does not provide explicit syntax for expressing multi-dimensional parallel loop nests, which is needed for embodiments described herein to apply multi-dimensional partitioning. So we currently use a perfect loop nest of loops marked with "# pragma omp parallel for" without any additional clauses at inner parallel loops instead. This is a legitimate workaround for the lack of explicit syntax, because treating those nested parallel loops as a multi-dimensional parallel loop does not break OpenMP semantics assuming nested OpenMP parallelism is disabled for the target device.

Figure 2:
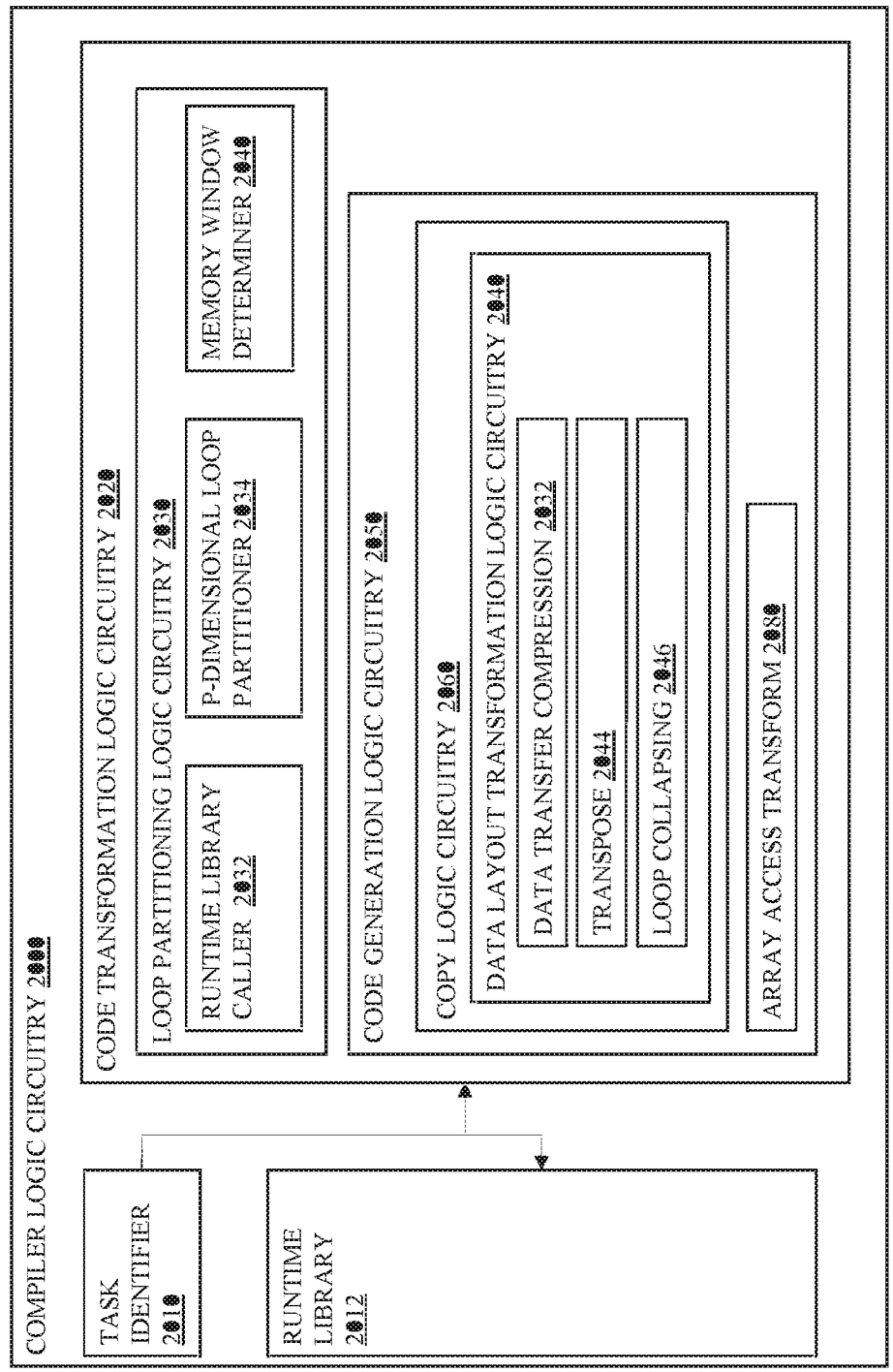
FIG. 2 depicts an embodiment of compiler logic circuitry such as the compiler logic circuitry shown in FIG. 1A.

FIG. 2 depicts an embodiment of compiler logic circuitry 2000 such as the compiler logic circuitry 1022 shown in FIG. 1A. The compiler logic circuitry 2000 may comprise a production compiler to compile binaries for distribution, a compiler to compile binaries for users or developers, or a just-in-time compiler to compile binaries while executing the binaries.

The compiler logic circuitry 2000 may comprise circuitry; a combination of circuitry, code, and a processor to execute the code; or a combination of code and a processor to execute the code. For instance, the compiler logic circuitry 2000 may comprise a state machine and/or application-specific integrated circuit (ASIC) to perform some or all the functionality of the compiler logic circuitry 2000.

The compiler logic circuitry 2000 may compile source code in stages including an intermediate stage and a machine code generation stage. Furthermore, the compiler logic circuitry 2000 may automatically and/or autonomously identify target code to offload to a target device and generate instructions transform the code to adapt to a memory constraint of the target device. In particular, the compiler logic circuitry 200 may transform the target code to partition data accesses such that the data accessed by a partition or chunk of the target code will fit within the memory constraint. For example, if the target device is a multiple processor accelerator and includes a constrained memory that is shared with all the processors or a special constrained memory that is particularly fast for the purposes of processing the target code, the compiler logic circuitry 2000 may include a task identifier to identify the target code and include a code transformation logic circuitry 2020 to transform the target code to meet the memory constraint requirements for offloading a task to the target device.

The compiler logic circuitry 2000 may comprise the task identifier 2010, a runtime library 2012, and the code transformation logic circuitry 2020. In many embodiments, the target code resides in a user code that will execute on a host device. The target code may include a mark or tag to identify the target code within the user code as code to offload to the target device.

The runtime library 2012 may include logic circuitry to perform calculations for target code to determine partitioning parameters to partition accesses to data into iteration space blocks, or chunks. For instance, the runtime library 2012 may comprise code to calculate an n-dimensional chunk of parallel iteration space such that the span of all parallel arrays over the chunk does not exceed the memory constraint. The runtime library 2012 may comprise code to calculate the span of an array over the n-dimensional chunk of parallel iteration space. The runtime library 2012 may comprise code to calculate the span of an array over a serial or sequential part of a loop nest. The runtime library 2012 may comprise code to calculate an adjustment for array index expressions in parallel dimensions for an array. And the runtime library 2012 may comprise code to calculate an adjustment for array index expressions in a sequential dimension for an array.

The code transformation logic circuitry 2020 may comprise loop partitioning logic circuitry 2030 and code generation logic circuitry 2050. The loop partitioning logic circuitry 2030 may partition parallel loops and sequential loops. The sequential loops are nested loops in parallel loop nests. In many embodiments, the loop partitioning logic circuitry 2030 may comprise a runtime library caller 2032, a P-dimensional loop partitioner 2034, and a memory window determiner 2040.

The runtime library caller 2032 may insert code (or instructions) to call runtime library functions. The runtime library functions may reside in the runtime library 2012 and/or be added to the target code during compilation. In many embodiments, the runtime library caller 2032 may call functions to calculate partitioning parameters included in the runtime library 2012.

The P-dimensional loop partitioner 2034 may partition one or more parallel loop nests into P-dimensional iteration space blocks. In some embodiments, the P-dimensional loop partitioner 2034 may partition one or more outer loops of the parallel loop nests into 1-dimensional iteration space blocks, one or more outer loops as well as the first nested loops of each parallel loop nest into 2-D iteration space blocks, or the like. The P-dimensional loop partitioner 2034 determine the number of chunks based on analysis of the target code as well as the memory constraint for the target device. For example, if de-linearization is determined to not be possible for a parallel loop nest, the P-dimensional loop partitioner 2034 may perform 1-D partitioning for that parallel loop nest.

The memory window determiner 2040 may determine data space memory windows that encompass the span of each of the iteration space blocks. In other words, the memory window determiner 2040 may map the data elements of each iteration space block that spans across all parallel loop nests to determine allocations in a constrained memory of the target device that do not overlap. If the spans of the iteration space blocks do overlap, the memory window determiner 2040 may instruct the code generation logic circuitry 2050 to perform data layout transformation so that the spans of the iteration space blocks do not overlap.

The code generation logic circuitry 2050 may generate instructions (or code) to partition the P-dimensional parallel loop nests in the target code. The code generation logic circuitry 2050 may comprise copy logic circuitry 2060 and array access transform 2080. The copy logic circuitry 2060 may generate copy instructions to insert into the offload task that copy data elements from memory in the host device to the constrained memory in the target device before processing an iteration space block of the target code and copy the data elements back to the host device after processing the iteration space block of the target code. Furthermore, the copy logic circuitry 2060 may include data layout transformation logic circuitry 2040 that may transform the data layout of data elements copied to the target device from the host device for processing a iteration space block of the target code.

The data layout transformation logic circuitry 2040 may comprise data transfer compression 2032, transpose 2040, and loop collapsing 2046. In other embodiments, additional loop optimizations may also benefit from data layout transformation such as data padding to enable better vectorization.

The data transfer compression 2032 may compress data elements during a transfer from the host device to the target device. Transferring blocks of sparse data leads to additional pressure on data transfer subsystem by transferring redundant data as well as making more invocations of data transfer API. After completion of execution on target device, the data is copied back from the local memory window back to the original output array.

The data transfer compression 2032 may modify code emitted for execution on target device correspondingly to reflect changes in elements' accesses. For instance, the data transfer compression 2032 may copy only the data elements that are accessed by the iteration space block of the target code rather than copying all the data elements within a contiguous block of the host memory such as a contiguous block of the data elements in array r discussed in conjunction with FIGS. 1A-K.

Below is an original source code or target code, a task offload code with 2-D partitioning, and task offload code with data compression. For this Original Source Code, the Loop nest was normalized so that loop indexes start with 0 and have 1 as increment.

```
int A[N];
int B [N];
# pragma omp target
# pragma omp parallel for
for (int i1=0; i1<I1; i1++) {
  # pragma omp parallel for
  for (int i0=0; i0<I0; i0++) {
    B[10*i1+2*i0]=A[9*i1+i0]*A[9*i1+i0]; } }
```

Below is code with offloading to device without the proposed transformation—2D partitioning. The code includes an initial code to create buffers, COPY IN Code, OFFLOAD Code, and COPY OUT Code. The code to create buffers may create buffers for data transfer on offload device based on block size and index expression. Calculation of buffer sizes is according to formula from 5.1:

LOC_SIZE_A_m=a_m*BLOCK_SIZE_m+(max by k c_m_k−min by k c_m_k)

Since, in current example, c_m_k is zero, the calculation becomes:

LOC_SIZE_A_m=a_m*BLOCK_SIZE_m.

The Sizes by dimensions are:
LOC_SIZE_A_0=1*BLOCK_SIZE_0
LOC_SIZE_A_0=9*BLOCK_SIZE_1

The buffer size for array A is (1*BLOCK_SIZE_0*9*BLOCK_SIZE_1). Doing similar calculations for array B we obtain:
LOC_SIZE_B_0=2*BLOCK_SIZE_0
LOC_SIZE_B_0=10*BLOCK_SIZE_1

The buffer size for array B is (2*BLOCK_SIZE_0*10*BLOCK_SIZE_1). The total amount of data for A is sizeof(int)*9*bsize1*bsize0 and the total amount of data for B is sizeof(int)*10*bsize1*2*bsize0.

```
int nblocks1=I1/bsize1;
int nblocks0=I0/bsize0;
for (int j1=0; j1<nblocks1; j1++) {
  for (int j0=0; j0<nblocks0; j0++) {
    int bufferA[9*bsize1*bsize0];
    int bufferB[10*bsize1*2*bsize0];
```

The COPY IN Code (below) may copy data to offload device for input arrays. Only A[ ] is an input:

```
    for (int i1=0; i1<bsize1; i1++) {
      for (int i0=0; i0<bsize0; i0++) {
        int i1_orig=j1*bsize1+i1;
        int i0_orig=j0*bsize0+i0;
        bufferA[9*i1+i0]=A[9*i1_orig+i0_orig]; } }
```

Below is the OFFLOAD Code. The offloaded code, executed on remote device.

```
    # pragma omp parallel for
    for (int i1=0; i1<bsize1; i1++) {
      # pragma omp parallel for
      for (int i0=0; i0<bsize0; i0++) {
        //Index expressions kept the same as in original code
        bufferB[10*i1+2*i0]=bufferA[9*i1+i0]*bufferA
          [9*i1+i0]; } }
```

Below is the COPY OUT Code to copy output data from offload device. Only B[ ] is an output.

```
    for (int i1=0; i1<bsize1; i1++) {
      for (int i0=0; i0<bsize0; i0++) {
        int i1_orig=j1*bsize1+i1;
        int i0_orig=j0*bsize0+i0;
        B[10*i1_orig+2*i0_orig]=bufferB[10*i1+2*i0]; } }
    } }
```

Below is the Optimized code with data compression. The code begins with Block size calculations and Memory accesses. Number 1: B[10*i1+2*i0], sorted_coeffs={[2:i0], [10:i1]}. block_size[0]=[1; 10/5]=[1;5] and block_size[1]= [1; MAX INTEGRAL]. Number 2: A[9*i1+i0], sorted_coeffs={[1:i0], [9:i1]}. block_size[0]=[1; 9/1]=[1;9] intersect [1;5]=[1;5] and block_size[1]=[1; MAX INTEGRAL]. Number 3: A[9*i1+i0] same as #2: bsize1 can be chosen any between 1 and MAX INTEGRAL and bsize0 can be chosen any between 1 and 5 depending on other properties of source code. The HW and SW stack is used.

The code includes an initial code to create buffers, COPY IN Code, OFFLOAD Code, and COPY OUT Code. The code to create buffers may create buffers for data transfer on offload device based on block size and index expression. The total amount of data for A is sizeof(int)*bsize0*bsize1 and the total amount of data for B is sizeof(int)*bsize0*bsize1.

```
int nblocks1=I1/bsize1;
int nblocks0=I0/bsize0;
for (int j1=0; j1<nblocks1; j1++) {
  for (int j0=0; j0<nblocks0; j0++) {
    int bufferA[bsize0*bsize1];
    int bufferB[bsize0*bsize1];
```

The COPY IN Code (below) may copy data to offload device for input arrays. Only A[ ] is an input:

```
for (int i1=0; i1<bsize1; i1++) {
  for (int i0=0; i0<bsize0; i0++) {
    int i1_orig=j1*bsize1+i1;
    int i0_orig=j0*bsize0+i0;
    bufferA[bsize0*i1+i0]=A[9*i1_orig+i0_orig]; } }
```

Below is the OFFLOAD Code. The offloaded code, executed on remote device.

```
# pragma omp parallel for
for (int i1=0; i1<bsize1; i1++) {
# pragma omp parallel for
for (int i0=0; i0<bsize0; i0++) {
  //Index expressions have been modified in order to fill
  //buffers densely
  bufferB[bsize0*i1+i0]=bufferA[bsize0*i1+i0]
    *bufferA[bsize0*i1+i0]; } }
```

Below is the COPY OUT Code to copy output data from offload device. Only B[ ] is an output.

```
for (int i1=0; i1<bsize1; i1++) {
  for (int i0=0; i0<bsize0; i0++) {
    int i1_orig=j1*bsize1+i1;
    int i0_orig=j0*bsize0+i0;
    B[10*i1_orig+2*i0_orig]=bufferB[bsize0*i1+i0];
  }} }
```

Memory allocation on the target device is reduced by a factor of:

(9*bsize1*bsize0+10*bsize1*2*bsize0)/
  (2*bsize0*bsize1)=(9+20)/2

This is a factor of about 15×. The amount of data transfer between host device and target device is also reduced approximately by the same factor.

The transpose 2044 may transpose row and columns of the data while copying the data elements from the host device to the target device. For instance, some target data may represent a table and the data elements for the table can reside in an array as a series of rows of the table or as a series of columns of the table. Some of the user code contains both unit stride and non-unit stride accesses within the same loop nest. In some instances, the target code access the data more efficiently if the copy instructions transpose the rows and columns of the data elements from the table based on a stride of access to the data elements.

To illustrate, the target data may reside in an array as a series of rows meaning that each data element of the first row resides in the array followed by each element of the second row, and so on through the entire table. If the target code accesses each data element in the first column in series followed by accessing each data element in the second column in series, the stride of the data element accesses for the column data is the number of data elements in each row so access would be improved with a unit stride (i.e., adjacent memory entries) rather than a stride across all data members of each row.

The following code transformation is an example of transposing:

The Original source code is below:

```
float A[N][M];
float B[M][N];
# pragma omp target
# pragma omp parallel for
for (int i1=0; i1<N; i1++) {
# pragma omp parallel for
  for (int i0=0; i0<M; i0++) {
    B[i0][i1]+=A[i1][i0];
```

The Array B is traversed non unitstride in inner loop while A is accessed with unitstride. Interchange of loop nest cannot achieve unitstrideness of accesses for both A and B at the same time.

The Optimized code is below. Block size calculations inserted from runtime library during compilation and Memory accesses in linearized form: Number 1: A[M*i1+i0], sorted_coeffs={[1:i0], [M:i1]}. The block_size[0]=[1; M/1]=[1;M] and the block_size[1]=[1; MAX INTEGRAL]. Number 2: B[N*i0+i1], sorted_coeffs={[1:i1], [N:i0]}. The block_size[0]=[1; MAX INTEGRAL] intersect [1;M]=[1; M] and the block_size[1]=[1; N/1]=[1;N] intersect [1; MAX INTEGRAL]=[1;N]. The bsize1 can be chosen any between 1 and N and the bsize0 can be chosen any between 1 and M depending on other properties of source code. The HW and SW stack is used. Further, the code may create buffers for data transfer on offload device.

```
int nblocks1=N/bsize1;
int nblocks0=M/bsize0;
for (int j1=0; j1<nblocks1; j1++) {
  for (int j0=0; j0<nblocks0; j0++) {
    int bufferA[bsize0*bsize1];
    int bufferB[bsize0*bsize1];
```

The COPY IN Code (below) may copy data to offload device for input arrays. Only A[ ] is an input:

```
for (int i1=0; i1<bsize1; i1++) {
  for (int i0=0; i0<bsize0; i0++) {
    int i1_orig=j1*bsize1+i1;
    int i0_orig=j0*bsize0+i0;
    bufferA[bsize0*i1+i0]=A[i1_orig][i0_orig];
    bufferB[bsize0*i1+i0]=B[i0_orig][i1_orig]; } }
```

Below is the OFFLOAD Code. The offloaded code, executed on remote device.

```
# pragma omp parallel for
for (int i1=0; i1<bsize1; i1++) {
# pragma omp parallel for
  for (int i0=0; i0<bsize0; i0++) {
    //Index expressions have been modified in order to fill
    buffers densely
    bufferB[bsize0*i1+i0]+=bufferA[bsize0*i1+i0]; } }
```

Below is the COPY OUT Code to copy output data from offload device. Only B[ ] is an output.

```
for (int i1=0; i1<bsize1; i1++) {
  for (int i0=0; i0<bsize0; i0++) {
    int i1_orig=j1*bsize1+i1;
```

```
        int i0_orig=j0*bsize0+i0;
        B[i0_orig][i1_orig]=bufferB[bsize0*i1+i0]; }}}}
```

The loop collapsing 2046 may apply loop collapsing techniques to expose additional opportunities for vectorization as well as to reduce loop maintenance overhead in deep loop nests. In other words, some nested loops can be vectorized to reduce the number of nested loops in the target code that is offloaded to the target device. In further embodiments, the loop collapsing 2046 may apply loop collapsing techniques to reduce the loop nest depth without vectorization.

The following code transformation is an example of loop collapsing:

Below is an Original source code, assuming abs(a)>1.

```
int acc=0;
# pragma omp target
# pragma omp parallel for
for (int i1=0; i1<M; i1++) {
    # pragma omp parallel for
    for (int i0=0; i0<N; i0++) {
        acc+=A[a*i1+i0]; } }
```

The Optimized code is below. Block size calculations inserted and Memory accesses in linearized form. Number 1: A[a*i1+i0], sorted_coeffs={[1:i0], [a:i1]}. The block_size[0]=[1; a] and the block_size[1]=[1; MAX INTEGRAL]. The bsize1 can be chosen to be any value within interval in block_size[1] and the bsize0 can be chosen to be any value within interval in block_size[0] depending on other properties of source code, HW and SW stack used. Further, the code may create buffers for data transfer on offload device.

```
int nblocks1=N/bsize1;
int nblocks0=M/bsize0;
int acc=0;
for (int j1=0; j1<nblocks1; j1++) {
    for (int j0=0; j0<nblocks0; j0++) {
        int bufferA[bsize0*bsize1];
```

The COPY IN Code is below. The COPY IN Code may COPY input data to an offload device.

```
        for (int i1=0; i1<bsize1; i1++) {
            for (int i0=0; i0<bsize0; i0++) {
                int i1_orig=j1*bsize1+i1;
                int i0_orig=j0*bsize0+i0;
                bufferA[bsize0*i1+i0]=A[a*i1_orig+i0_orig]; } }
```

The TASK OFFLOAD Code is below. The TASK OFFLOAD Code may offloaded code, executed on remote device.

```
        int t=0;
        # pragma omp parallel for
        for (int i=0; i<bsize1*bsize0; i++) {
            t+=bufferA[i]; } }
```

The COPY OUT Code is below. The COPY OUT Code may add a partial sum to acc.

```
        acc+=t }
```

The array access transform 2080 may change base addresses from the original array to its corresponding memory window in the local array in the constrained memory. Furthermore, the array access transform 2080 may update array index expressions, as necessary. For instance, some embodiments modify the array index expressions to account for data compression during the transfer of data from the host device to the target device.

Figure 3B:
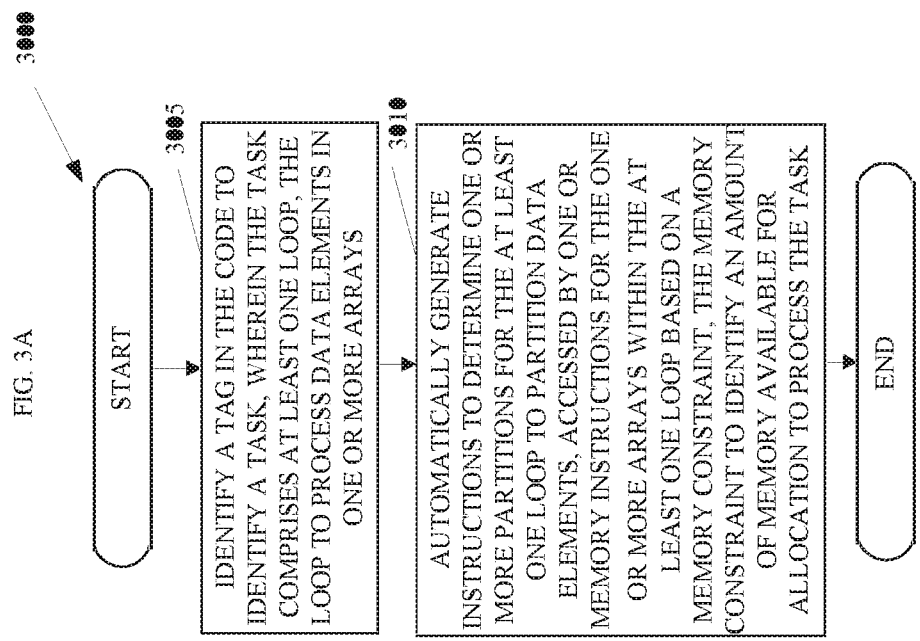
FIGS. 3A-C depict flowcharts of embodiments to transform code.
Figure 3A:
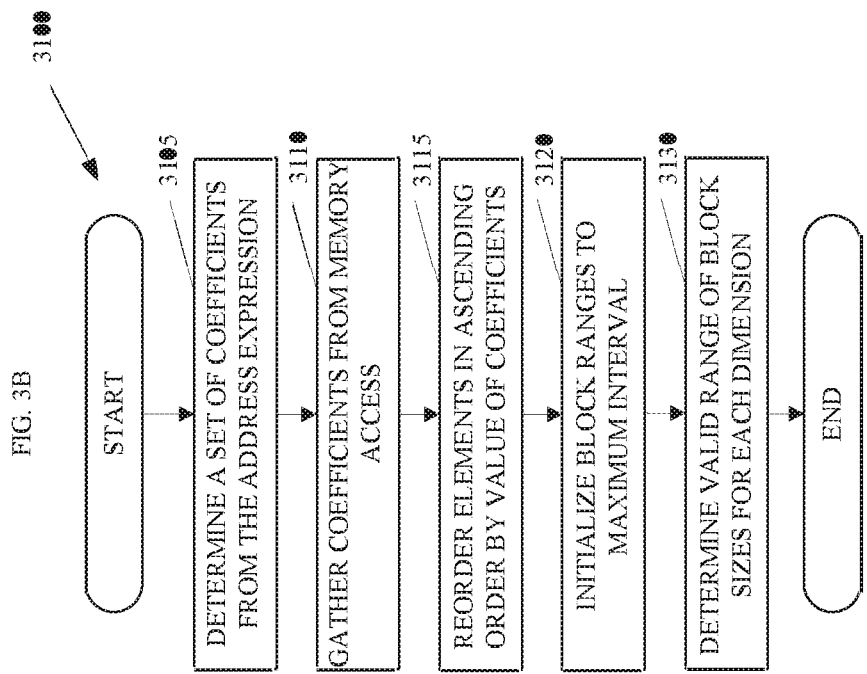
Figure 3C:
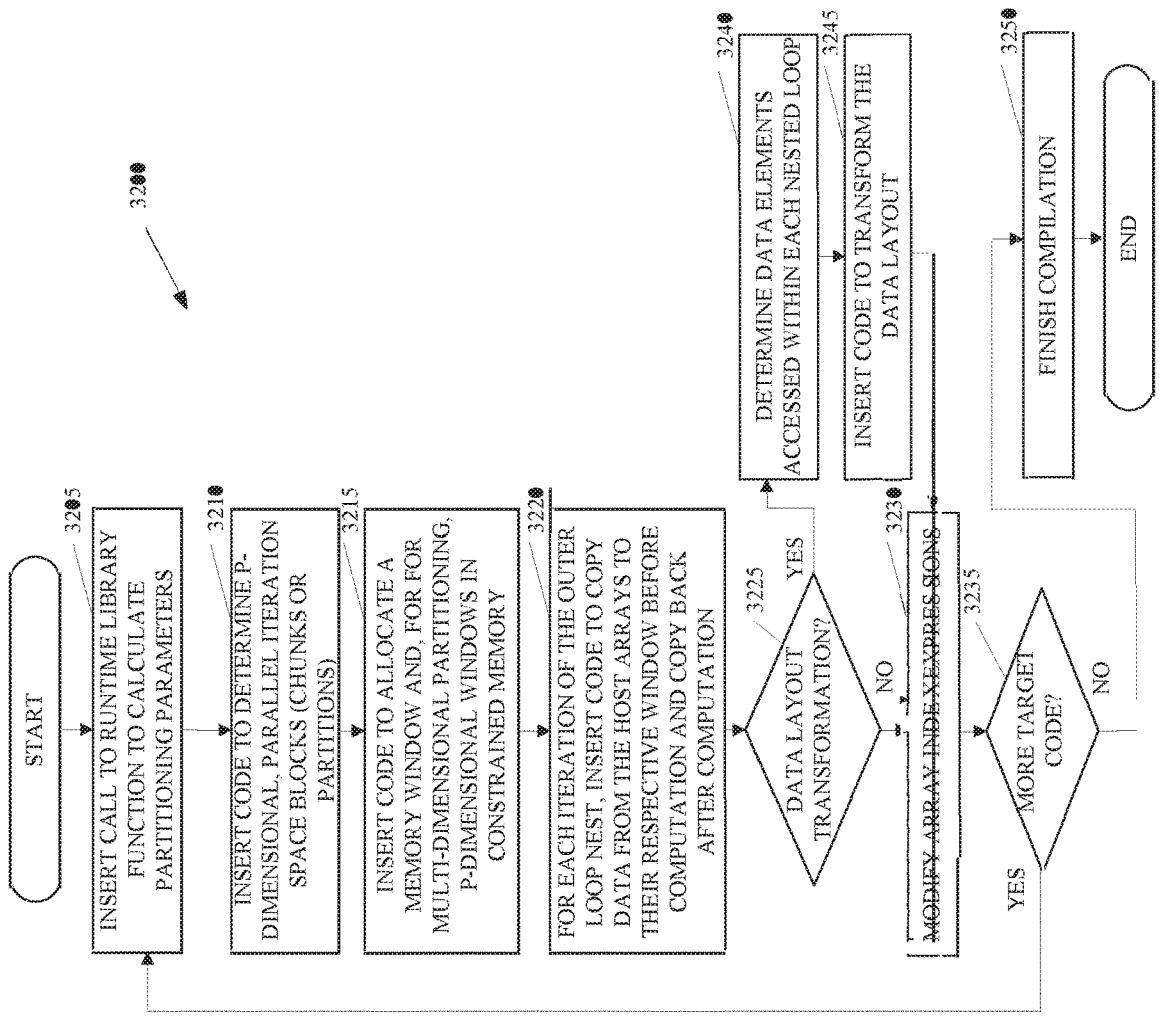

FIGS. 3A-C depict flowcharts of embodiments to transform code for offloading to a target device with a special constrained memory such as fast memory on a graphics accelerator card, constrained memory shared among multiple processors on an FPGA board, or other constrained memory. FIG. 3A illustrates a flowchart 3000 to transform target code to offload to a target device. The flowchart 3000 starts with identifying, by a compiler logic circuitry, a tag in the code to identify a task, wherein the task comprises at least one loop, the loop to process data elements in one or more arrays (element 3005). In many embodiments, the compiler logic circuitry, such as the compiler logic circuitry 2000 in FIG. 2 and the compiler logic circuitry 1022 in FIG. 1A, may receive a user code to compile that includes target code to offload to another device or processor, referred to as a target device. The target device may provide advantages to processing the target code such as a fast but limited amount of memory, parallel processing, or the like. In several embodiments, the memory on the target device has a memory constraint that can prevent some target code from being offloaded without modification. The target code may include a loop in a loop nest and the loop nest may include one or more parallel loops. The memory requirements for the data accessed by the loop may exceed the memory constraint. In other words, the target code cannot be offloaded to the target device unless the target code is modified to reduce memory requirements. Identifying the tag, by the compiler logic circuitry, may identify a line in the target code that marks the beginning and/or end of a target code for offloading so that the compiler logic circuitry can transform and offload the target code.

After identifying the tag, the compiler logic circuitry may automatically generate instructions to determine one or more partitions for the at least one loop to partition data elements, accessed by the one or more memory access instructions for the one or more arrays within the at least one loop, based on a memory constraint, the memory constraint to identify an amount of memory available for allocation to process the task (element 3010). In general, the compiler logic circuitry may generate instructions to create a task offload code. The task offload code may perform the same processes as the original target code but may partition the target code into iteration space blocks that utilize an amount of memory based on the memory constraint. In other words, the compiler logic circuitry may transform the code so that one or more parallel loop nests that process arrays of data are partitioned into iteration space blocks of the parallel loop nests based on the amount of data that the iteration space blocks access. As a result, the target device can process the target code a chunk at a time without exceeding the memory constraint. In further embodiments, the compiler logic circuitry also changes or transforms the data layout of data elements for the target code to increase the efficiency of use of memory bandwidth and constrained memory.

FIG. 3B illustrates a flowchart 3100 to determine block sizes for data layout transformation. The flowchart 3100 begins with determining a set of coefficients from an address expression (element 3105). A compiler logic circuitry, such as the compiler logic circuitry 2000 in FIG. 2 and the compiler logic circuitry 1024 in FIG. 1A, may generate instructions to find the address expressions for data elements that will be copied to the target device for execution of a task offload code. In some embodiments, the code may reside in a runtime library that is accessed by or inserted into the target code to generate the task offload code. The expression may comprise a linear function of array indices with scalar coefficients such as A[17*i3+2*i2+5*i1+9*i0]. The scalar coefficients include 17, 2, 5, and 9.

The compiler logic circuitry may gather the coefficients from the memory access (element 3110) and reorder the elements in ascending order by value of the coefficients (element 3115). For instance, the sorted coefficients for A[17*i3+2*i2+5*i1+9*i0] are {[2:i2],[5:i1],[9:i0],[17:i3]}.

After reordering the element in ascending order, the compiler logic circuitry may initialize the block ranges to a maximum interval (element 3120). For instance, for A[17*i3+2*i2+5*i1+9*i0], the maximum interval for block range [2]=5/2=[1; 2], the maximum interval for block range [1]=9/5=[1; 1], the maximum interval for block range [0]=17/9=[1;1], and the maximum interval for block range [3]=[1; MAX].

Once the block ranges are initialized the maximum interval, the compiler logic circuitry may determine a valid range of block sizes for each dimension (element 3130). The compiler logic circuitry may intersect ranges of a current interval and the ranges calculated for the same dimensions from other memory accesses. The intersection of intervals x, y is new interval constructed from lower bound=max(lower bound x, lower bound y) and
upper bound=min(upper bound x, upper bound y)

To illustrate, the second memory access in the above example may be A[20*i3−3*i2+6*i1+8*i0]. The sorted coefficients for the second interval are {[3:i2],[6:i1],[8:i0], [20:i3]}. The maximum interval for block range [2]=6/3=[1; 2], the maximum interval for block range [1]=8/6=[1; 1], the maximum interval for block range [0]=20/8=[1;2], and the maximum interval for block range [3]=[1; MAX].

Upon comparing the maximum intervals for each block range, the intersection of the block range [2] has a lower bound that is the maximum of [1,1] and an upper bound that is the maximum of [2,2] so the intersection of block range [2] is [1,2]. Similarly, the intersection of the block range [1] is [1,1], the intersection for block range [0] is [1,1], and the block range [3] is set to [1,MAX].

FIG. 3C illustrates a flowchart to transform code with a compiler logic circuitry such as the compiler logic circuitry 2000 illustrated in FIG. 2 and the compiler logic circuitry 1022 in FIG. 1A. The flowchart begins with inserting a call to a runtime library function to calculate partitioning parameters (element 3210). The compiler logic circuitry may transform the user code into an intermediate code during an analysis stage and then the compiler logic circuitry may begin transform target code within the user code that is identified to offload to a target device. Insertion of one or more calls to the runtime library may cause the target device to call the runtime library to perform functions that the host device or runtime environment may perform more efficiently than the target device. In some embodiments, the target device may execute assembly language or machine language. In other embodiments, the target device may execute a higher-level language.

After inserting a call to the runtime library, the compiler logic circuitry may insert code to determine P-dimensional, parallel iteration space blocks, which may also be referred to as chunks or partitions, (element 3210). The runtime library function may determine par_is_chunkp for one or more parallel loop nests, which is an n-dimensional iteration space block of parallel iteration space. The compiler logic circuitry may insert iteration space code such as code to establish constants and variables, as required, to establish one or more new outer loops to create the iteration space partitions.

Thereafter, the compiler logic circuitry may insert code to allocate a memory window and, for multi-dimensional partitioning, code to allocate P-dimensional windows in constrained memory (element 3215). In many embodiments, the compiler logic circuitry may insert code to initialize a one dimensional or multi-dimensional local array such as loc in the constrained memory with the amount of memory calculated for each iteration space block of the offload code.

The compiler logic circuitry may also insert code to copy data elements from the host device memory to the target device before processing the data elements for an iteration space block of the target code and code to copy the data elements back to the host device after processing an iteration space block of the target code for each iteration of the outer loop nest (element 3220). In several embodiments, the compiler logic circuitry may insert a copy instruction to copy data elements from a host array in the host device's memory to a local array in the constrained memory of the target device prior to the computations by the iteration space block and insert a copy instruction to copy the data elements from the local array to the host array after completion of the computations by the iteration space block.

If the compiler logic circuitry determines to perform data layout transformation (element 3225), the compiler logic circuitry may determine data elements accessed within each nested loop (element 3230) and insert code to transform the data layout (element 3245). For example, the compiler logic circuitry may copy only data elements accessed by an iteration space block of the target code to compress the data, transpose the data layout, and/or collapse some of the nested loops.

If the compiler logic circuitry determines not to perform data layout transformation (element 3225), the compiler logic circuitry may modify the array index expressions in the target code to process an iteration space block of the data elements rather than processing all the data elements (element 3230). For example, the compiler logic circuitry may add an offset to the array index expressions in an array access instruction.

After modifying the array index expressions, the compiler logic circuitry may determine if any further target code to process (element 3235). If there is more target code to process then the flowchart 3200 returns to element 3205. Otherwise, the compiler logic circuitry may finish compilation of the user code (element 3250). Completing the compilation process may involve transforming the target code to an executable form for offloading to the target device and transforming the user code into an executable format for the host device.

Figure 4:
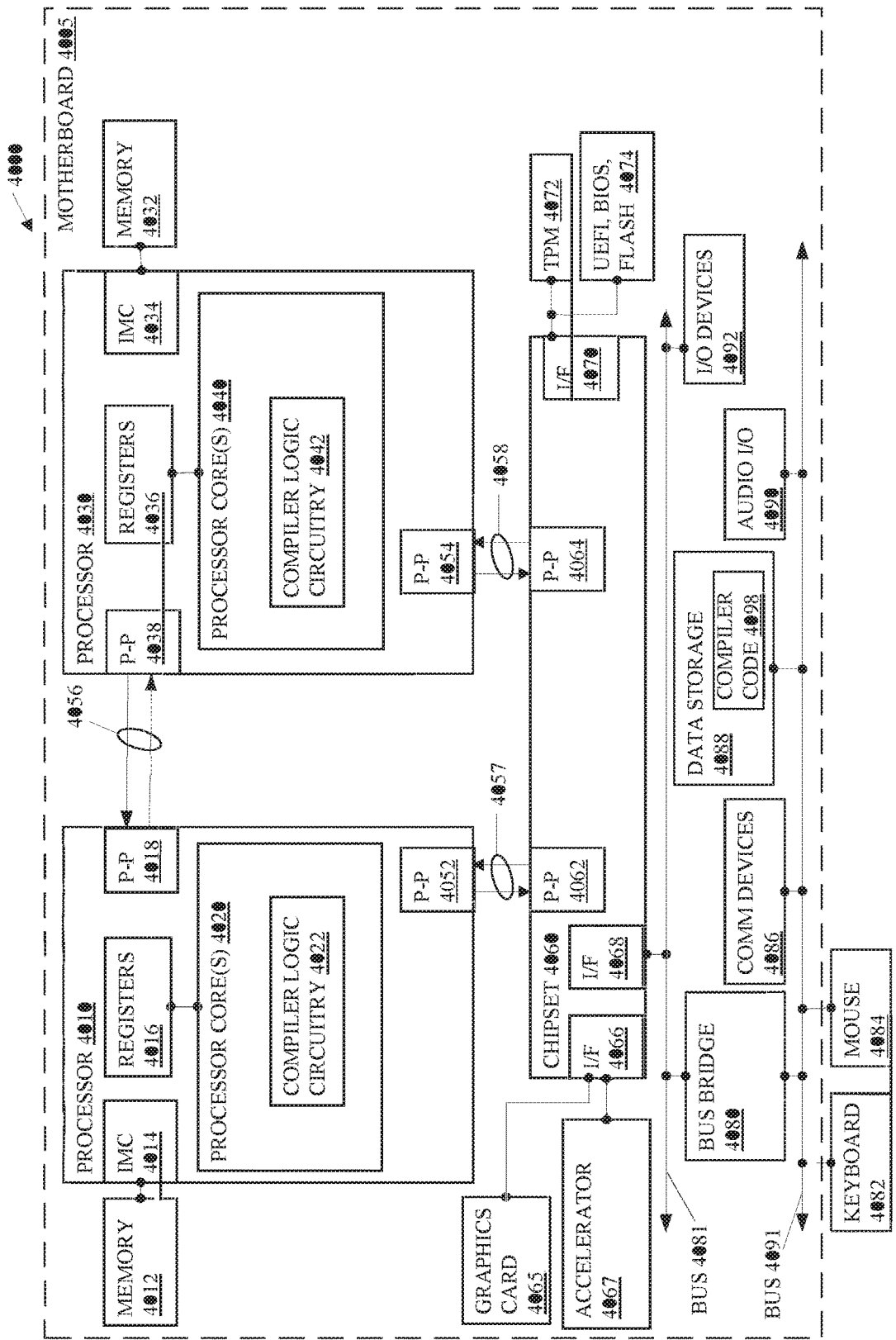
FIG. 4 depicts another embodiment of a system including a host device, memory, and a target device.

FIG. 4 illustrates an embodiment of a system 4000 such as the system 1000 in FIG. 1A and the apparatuses 400 and 450 in FIG. 4. The system 4000 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 4000 may have a single processor with one core or more than one processor. Note that the term "processor" refers to a processor with a single core or a processor package with multiple processor cores.

As shown in FIG. 4, system 4000 comprises a motherboard 4005 for mounting platform components. The motherboard 4005 is a point-to-point interconnect platform that includes a first processor 4010 and a second processor 4030 coupled via a point-to-point interconnect 4056 such as an Ultra Path Interconnect (UPI). In other embodiments, the system 4000 may be of another bus architecture, such as a multi-drop bus. Furthermore, each of processors 4010 and 4030 may be processor packages with multiple processor cores including processor core(s) 4020 and 4040, respectively. While the system 4000 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 4010 and the chipset 4060. Some platforms may include additional components and some platforms may only include sockets to mount the processors and/or the chipset.

The first processor 4010 includes an integrated memory controller (IMC) 4014 and point-to-point (P-P) interfaces 4018 and 4052. Similarly, the second processor 4030 includes an IMC 4034 and P-P interfaces 4038 and 4054. The IMC's 4014 and 4034 couple the processors 4010 and 4030, respectively, to respective memories, a memory 4012 and a memory 4032. The memories 4012 and 4032 may be portions of the main memory (e.g., a dynamic random-access memory (DRAM)) for the platform (such as the main memory 478 in FIG. 4) such as double data rate type 3 (DDR3) or type 4 (DDR4) synchronous DRAM (SDRAM). In the present embodiment, the memories 4012 and 4032 locally attach to the respective processors 4010 and 4030. In other embodiments, the main memory may couple with the processors via a bus and shared memory hub.

The processors 4010 and 4030 comprise caches coupled with each of the processor core(s) 4020 and 4040, respectively. The first processor 4010 couples to a chipset 4060 via P-P interconnects 4052 and 4062 and the second processor 4030 couples to a chipset 4060 via P-P interconnects 4054 and 4064. Direct Media Interfaces (DMIs) 4057 and 4058 may couple the P-P interconnects 4052 and 4062 and the P-P interconnects 4054 and 4064, respectively. The DMI may be a high-speed interconnect that facilitates, e.g., eight Giga Transfers per second (GT/s) such as DMI 3.0. In other embodiments, the processors 4010 and 4030 may interconnect via a bus.

The chipset 4060 may comprise a controller hub such as a platform controller hub (PCH). The chipset 4060 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 4060 may comprise more than one controller hub such as a chipset with a memory controller hub, a graphics controller hub, and an input/output (I/O) controller hub.

In the present embodiment, the chipset 4060 couples with a trusted platform module (TPM) 4072 and the UEFI, BIOS, Flash component 4074 via an interface (I/F) 4070. The TPM 4072 is a dedicated microcontroller designed to secure hardware by integrating cryptographic keys into devices. The UEFI, BIOS, Flash component 4074 may provide pre-boot code.

Furthermore, chipset 4060 includes an I/F 4066 to couple chipset 4060 with a high-performance graphics engine, graphics card 4065 and an accelerator card 4067. The I/F 4066 may be, for example, a Peripheral Component Interconnect-enhanced (PCI-e). The graphics card 4065 and an accelerator card 4067 may comprise target devices such as the target device 1060 illustrated in FIG. 1A.

Referring again to FIG. 4, various I/O devices 4092 couple to the bus 4081, along with a bus bridge 4080 which couples the bus 4081 to a second bus 4091 and an I/F 4068 that connects the bus 4081 with the chipset 4060. In one embodiment, the second bus 4091 may be a low pin count (LPC) bus. Various devices may couple to the second bus 4091 including, for example, a keyboard 4082, a mouse 4084, communication devices 4086 and a data storage unit 4088 that may store code such as the compiler code 4098. The compiler code 4098 may comprise code to implement the compiler logic circuitry 1022 illustrated in FIG. 1A and may also comprise code to implement the compiler logic circuitry 4022 and 4042 in the processor cores 4020 and 4040, respectively. The compiler code 4096 may compile target code located in memory such as the memory 4012, memory 4032, registers 4016, register 4036, data storage 4088, I/O devices 4092, and/or any other data storage accessible by the system 4000.

Furthermore, an audio I/O 4090 may couple to second bus 4091. Many of the I/O devices 4092, communication devices 4086, and the data storage unit 4088 may reside on the motherboard 4005 while the keyboard 4082 and the mouse 4084 may be add-on peripherals. In other embodiments, some or all the I/O devices 4092, communication devices 4086, and the data storage unit 4088 are add-on peripherals and do not reside on the motherboard 4005.

FIG. 5 illustrates an example of a storage medium 5000 to store code such as the compiler code 4098 illustrated in FIG. 4. Storage medium 5000 may comprise an article of manufacture. In some examples, storage medium 5000 may include any non-transitory computer readable medium or machine readable medium, such as an optical, magnetic or semiconductor storage. Storage medium 5000 may store various types of computer executable instructions, such as instructions to implement logic flows and/or techniques described herein. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

FIG. 6 illustrates an example computing platform 6000 such as the system 1000 illustrated in FIG. 1A and the system 4000 shown in FIG. 4. In some examples, as shown in FIG. 6, computing platform 6000 may include a processing component 6010, other platform components or a communications interface 6030. According to some examples, computing platform 6000 may be implemented in a computing device such as a server in a system such as a data center or server farm that supports a manager or controller for managing configurable computing resources as mentioned above. Furthermore, the communications interface 6030 may comprise a wake-up radio (WUR) and may be capable of waking up a main radio of the computing platform 6000.

According to some examples, processing component 6010 may execute processing operations or logic for apparatus 6015 described herein. Processing component 6010 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements, which may reside in the storage medium 6020, may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 6025 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 6030 may include logic and/or features to support a communication interface. For these examples, communications interface 6030 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such as those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 6000 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 6000 described herein, may be included or omitted in various embodiments of computing platform 6000, as suitably desired.

The components and features of computing platform 6000 may be implemented using any combination of discrete circuitry, ASICs, logic gates and/or single chip architectures. Further, the features of computing platform 6000 may be implemented using microcontrollers, programmable logic arrays and/or microprocessors or any combination of the foregoing where suitably appropriate. It is noted that hardware, firmware and/or software elements may be collectively or individually referred to herein as "logic".

It should be appreciated that the exemplary computing platform 6000 shown in the block diagram of FIG. 6 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and also implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language, and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

Several embodiments have one or more potentially advantages effects. For instance, automatically and/or autonomously transforming target code to execute in a memory constrained environment advantageously facilitates use of memory constrained resources such as the target devices described herein. Determining iteration space blocks (also referred to as chunks or partitions), advantageously partitions the data usage by each iteration space block of the target code so data elements for the target code can fit in the constrained memory. Generating instructions to determine one or more partitions advantageously facilitates the use of target code on multiple different target devices with different memory constraints. Transforming data layout advantageously improves the efficiency of access to the data elements and reduces memory bandwidth requirements. Compressing data layout advantageously improves the efficiency of access to the data elements and reduces memory bandwidth requirements. Transposing a data layout advantageously improves the efficiency of access to the data elements and reduces memory bandwidth requirements. Collapsing loops advantageously improves the efficiency of access to the data elements and reduces memory bandwidth requirements.

Examples of Further Embodiments

The following examples pertain to further embodiments. Specifics in the examples may be used anywhere in one or more embodiments.

Example 1 is an apparatus to transform code. The apparatus comprises memory to comprise the code; and logic circuitry coupled with the memory to identify a tag in the code to identify a task, wherein the task comprises at least one loop in a loop nest, the loop to process data elements in one or more arrays, the loop nest including one or more parallel loops; and to automatically generate instructions to determine one or more partitions for the at least one loop to partition data elements, accessed by one or more memory access instructions for the one or more arrays within the at least one loop, based on a memory constraint, the memory constraint to identify an amount of memory available for allocation to process the task. In Example 2, the apparatus of claim 1, wherein the logic circuitry is configured to determine the memory constraint based on the amount of memory available to process the task at runtime. In Example 3, the apparatus of claim 1, wherein the logic circuitry is configured to determine the memory constraint based on an estimate of the amount of memory available to process the task. In Example 4, the apparatus of claim 1, wherein the logic circuitry is configured generate instructions to determine one or more partitions for outer loops of the task, wherein the one or more outer loops comprise parallel loops.

In Example 5, the apparatus of claim 1, wherein the logic circuitry is configured to determine one or more iteration space blocks for the parallel loops, each iteration space block to identify a subset of the data elements to be processed by a partition of the one or more arrays. In Example 6, the apparatus of claim 5, wherein the logic circuitry is configured to determine non-overlapping subsets of the data elements for the one or more iteration space blocks. In Example 7, the apparatus of claim 5, wherein the logic circuitry is configured to determine a memory window for each of the iteration space blocks, wherein the memory window comprises a portion of the amount of memory available for allocation to process the task for a span of one of the iteration space blocks, wherein the span is the data elements in the one or more arrays that are accessed by a duration of a single iteration block of the task. In Example 8, the apparatus of claim 8, wherein the logic circuitry is configured to determine non-overlapping spans for the memory windows. In Example 9, the apparatus of claim 1, wherein the logic circuitry is configured to transform array accesses. In Example 10, the apparatus of claim 1, wherein the logic circuitry is configured to insert instructions to call a runtime library to calculate an iteration space block for the at least one loop.

In Example 11, the apparatus of claim 1, wherein the logic circuitry is configured to insert instructions to copy data elements from a host device to prior to execution of an iteration space block of the task and after completion of the iteration space block of the task, wherein the iteration space block of the task comprises a duration of the task during which a portion of the one or more arrays access data elements in a memory window associated with the iteration space block. In Example 12, the apparatus of claim 11, wherein the logic circuitry is configured to insert instructions to perform a data layout transformation while copying the data elements from the host device. In Example 13, the apparatus of claim 11, wherein the data layout transformation comprises data transfer compression to densely store the data elements. In Example 14, the apparatus of claim 11, wherein the data layout transformation comprises a data transposition to reduce a stride of memory accesses. In Example 15, the apparatus of claim 11, wherein the data layout transformation comprises a loop collapsing to reduce a number of serial loops in a loop nest, wherein the at least one loop comprises a loop nest.

In Example 16, a method to transform code. The method comprises identifying, by a compiler logic circuitry, a tag in the code to identify a task, wherein the task comprises at least one loop in a loop nest, the loop to process data elements in one or more arrays, the loop nest including one or more parallel loops; and automatically generating, by the compiler logic circuitry, instructions to determine one or more partitions for the at least one loop to partition data elements, accessed by one or more memory access instructions for the one or more arrays within the at least one loop, based on a memory constraint, the memory constraint to identify an amount of memory available for allocation to process the task. In Example 17, the method of claim 16, further comprising determining the memory constraint based on the amount of memory available to process the task at runtime. In Example 18, the method of claim 16, further comprising determining the memory constraint based on an estimate of the amount of memory available to process the task. In Example 19, the method of claim 16, wherein automatically generating instructions comprises generating instructions to determine one or more partitions for outer loops of the task, wherein the one or more outer loops comprise parallel loops. In Example 20, the method of claim 19, wherein automatically generating instructions comprises determining one or more iteration space blocks for the parallel loops, each iteration space block to identify a subset of the data elements to be processed by a partition of the one or more arrays. In Example 21, the method of claim 20, wherein automatically generating instructions comprises determining non-overlapping subsets of the data elements for the one or more iteration space blocks. In Example 22, the method of claim 20, wherein automatically generating instructions comprises determining a memory window for the iteration space blocks, wherein the memory window comprises a portion of the amount of memory available for allocation to process the task for a span of one of the iteration space blocks, wherein the span is the data elements in the one or more arrays that are accessed by a duration of a single iteration block of the task.

In Example 23, the method of claim 22, wherein automatically generating instructions comprises determining non-overlapping spans for the memory windows. In Example 24, the method of claim 16, wherein automatically generating instructions comprises transforming array accesses. In Example 25, the method of claim 16, wherein automatically generating instructions comprises inserting instructions to call a runtime library to calculate an iteration space block for the at least one loop. In Example 26, the method of claim 16, wherein automatically generating instructions comprises inserting instructions to copy data elements from a host device to prior to execution of an iteration space block of the task and after completion of the iteration space block of the task, wherein the iteration space block of the task comprises a duration of the task during which a portion of the one or more arrays access data elements in a memory window associated with the iteration space block. In Example 27, the method of claim 26, wherein automatically generating instructions comprises inserting instructions to perform a data layout transformation while copying the data elements from the host device. In Example 28, the method of claim 26, wherein the data layout transformation comprises data transfer compression to selectively copy data that is accessed during execution of the iteration space block of the task. In Example 29, the method of claim 26, wherein the data layout transformation comprises transposing data elements to reduce a stride of memory accesses. In Example 30, the method of claim 26, wherein the data layout transformation comprises collapsing at least one loop to reduce a number of serial loops in a loop nest, wherein the at least one loop comprises a loop nest.

Example 31 is a system to transform code. The system comprises a memory comprising a dynamic random-access memory and the code; and logic circuitry coupled with the memory to identify a tag in the code to identify a task, wherein the task comprises at least one loop in a loop nest, the loop to process data elements in one or more arrays, the loop nest including one or more parallel loops; and to automatically generate instructions to determine one or more partitions for the at least one loop to partition data elements, accessed by one or more memory access instructions for the one or more arrays within the at least one loop, based on a memory constraint, the memory constraint to identify an amount of memory available for allocation to process the task. In Example 32, the system of claim 31, further comprising a target device coupled with the logic circuitry to execute the instructions to process the task. In Example 33, the system of claim 31, wherein the logic circuitry is configured to determine the memory constraint based on the amount of memory available to process the task at runtime.

In Example 34, the system of claim 31, wherein the logic circuitry is configured to determine the memory constraint based on an estimate of the amount of memory available to process the task.

In Example 35, the system of claim 31, wherein the logic circuitry is configured to determine one or more partitions for outer loops of the task, wherein the one or more outer loops comprise parallel loops. In Example 36, the system of claim 35, wherein the logic circuitry is configured to determine one or more iteration space blocks for the parallel loops, each iteration space block to identify a subset of the data elements to be processed by a partition of the one or more arrays. In Example 37, the system of claim 36, wherein the logic circuitry is configured to determine non-overlapping subsets of the data elements for the one or more iteration space blocks. In Example 38, the system of claim 36, wherein the logic circuitry is configured to determine a memory window for each of the iteration space blocks, wherein the memory window comprises a portion of the amount of memory available for allocation to process the task for a span of one of the iteration space blocks, wherein the span is the data elements in the one or more arrays that are accessed by a duration of a single iteration block of the task. In Example 39, the system of claim 31, wherein the logic circuitry is configured to determine non-overlapping spans for the memory windows. In Example 40, the system of claim 31, wherein the logic circuitry is configured to transform array accesses. In Example 41, the system of claim 31, wherein the logic circuitry is configured to insert instructions to call a runtime library to calculate an iteration space block for the at least one loop. In Example 42, the system of claim 31, wherein the logic circuitry is configured to insert instructions to copy data elements from a host device to prior to execution of an iteration space block of the task and after completion of the iteration space block of the task, wherein the iteration space block of the task comprises a duration of the task during which a portion of the one or more arrays access data elements in a memory window associated with the iteration space block. In Example 43, the system of claim 42, wherein the logic circuitry is configured to insert instructions to perform a data layout transformation while copying the data elements from the host device. In Example 44, the system of claim 42, wherein the data layout transformation comprises data transfer compression to densely store the data elements. In Example 45, the system of claim 42, wherein the data layout transformation comprises a data transposition to reduce a stride of memory accesses. In Example 46, the system of claim 42, wherein the data layout transformation comprises a loop collapsing to reduce a number of serial loops in a loop nest.

Example 47 is a non-transitory machine-readable medium containing instructions, which when executed by a processor, cause the processor to perform operations, the operations comprising identifying a tag in the code to identify a task, wherein the task comprises at least one loop in a loop nest, the loop to process data elements in one or more arrays, the loop nest including one or more parallel loops; and automatically generating instructions to determine one or more partitions for the at least one loop to partition data elements, accessed by one or more memory access instructions for the one or more arrays within the at least one loop, based on a memory constraint, the memory constraint to identify an amount of memory available for allocation to process the task. In Example 48, the machine-readable medium of claim 47, wherein the operations further comprise determining the memory constraint based on the amount of memory available to process the task at runtime.

In Example 49, the machine-readable medium of claim 47, wherein the operations further comprise determining the memory constraint based on an estimate of the amount of memory available to process the task. In Example 50, the machine-readable medium of claim 47, wherein automatically generating instructions comprises generating instructions to determine one or more partitions for outer loops of the task, wherein the one or more outer loops comprise parallel loops. In Example 51, the machine-readable medium of claim 47, wherein automatically generating instructions comprises determining one or more iteration space blocks for the parallel loops, each iteration space block to identify a subset of the data elements to be processed by a partition of the one or more arrays. In Example 52, the machine-readable medium of claim 47, automatically generating instructions comprises determining non-overlapping subsets of the data elements for the one or more iteration space blocks. In Example 53, the machine-readable medium of claim 52, wherein automatically generating instructions comprises determining a memory window for the iteration space blocks, wherein the memory window comprises a portion of the amount of memory available for allocation to process the task for a span of one of the iteration space blocks, wherein the span is the data elements in the one or more arrays that are accessed by a duration of the iteration space block. In Example 54, the machine-readable medium of claim 53, wherein automatically generating instructions comprises determining non-overlapping spans for the memory windows. In Example 55, the machine-readable medium of claim 47, wherein automatically generating instructions comprises transforming array accesses. In Example 56, the machine-readable medium of claim 47, wherein automatically generating instructions comprises inserting instructions to call a runtime library to calculate an iteration space block for the at least one loop.

In Example 57, the machine-readable medium of claim 47, wherein automatically generating instructions comprises inserting instructions to copy data elements from a host device to prior to execution of an iteration space block of the task and after completion of the iteration space block of the task, wherein the iteration space block of the task comprises a duration of the task during which a portion of the one or more arrays access data elements in a memory window associated with the iteration space block. In Example 58, the machine-readable medium of claim 57, wherein automatically generating instructions comprises inserting instructions to perform a data layout transformation while copying the data elements from the host device. In Example 59, the machine-readable medium of claim 57, wherein the data layout transformation comprises data transfer compression to selectively copy data that is accessed during execution of the iteration space block of the task. In Example 60, the machine-readable medium of claim 57, wherein the data layout transformation comprises transposing data elements to reduce a stride of memory accesses. In Example 61, the machine-readable medium of claim 57, wherein the data layout transformation comprises collapsing at least one loop to reduce a number of serial loops in a loop nest, wherein the at least one loop comprises a loop nest.

In Example 62 is an apparatus to transform code. The method comprises a means for identifying a tag in the code to identify a task, wherein the task comprises at least one loop in a loop nest, the loop to process data elements in one or more arrays, the loop nest including one or more parallel loops; and a means for automatically generating instructions to determine one or more partitions for the at least one loop to partition data elements, accessed by the one or more arrays within the at least one loop, based on a memory constraint, the memory constraint to identify an amount of memory available for allocation to process the task. In Example 63, the apparatus of claim 62, further comprising a means for determining the memory constraint based on the amount of memory available to process the task at runtime. In Example 64, the apparatus of claim 62, further comprising a means for determining the memory constraint based on an estimate of the amount of memory available to process the task. In Example 65, the apparatus of claim 62, wherein the means for automatically generating instructions comprises a means for generating instructions to determine one or more partitions for outer loops of the task, wherein the one or more outer loops comprise parallel loops. In Example 66, the apparatus of claim 65, wherein the means for automatically generating instructions comprises a means for determining one or more iteration space blocks for the parallel loops, each iteration space block to identify a subset of the data elements to be processed by a partition of the one or more arrays. In Example 67, the apparatus of claim 66, wherein the means for automatically generating instructions comprises a means for determining non-overlapping subsets of the data elements for the one or more iteration space blocks. In Example 68, the apparatus of claim 66, wherein the means for automatically generating instructions comprises a means for determining a memory window for the iteration space blocks, wherein the memory window comprises a portion of the amount of memory available for allocation to process the task for a span of one of the iteration space blocks, wherein the span is the data elements in the one or more arrays that are accessed by a duration of a single iteration block of the task. In Example 69, the apparatus of claim 62, wherein the means for automatically generating instructions comprises a means for determining non-overlapping spans for the memory windows. In Example 70, the apparatus of claim 69, wherein the means for automatically generating instructions comprises a means for transforming array accesses.

In Example 71, the apparatus of claim 69, wherein the means for automatically generating instructions comprises a means for inserting instructions to call a runtime library to calculate an iteration space block for the at least one loop. In Example 72, the apparatus of claim 69, wherein the means for automatically generating instructions comprises a means for inserting instructions to copy data elements from a host device to prior to execution of an iteration space block of the task and after completion of the iteration space block of the task, wherein the iteration space block of the task comprises a duration of the task during which a portion of the one or more arrays access data elements in a memory window associated with the iteration space block. In Example 73, the apparatus of claim 72, wherein the means for automatically generating instructions comprises a means for inserting instructions to perform a data layout transformation while copying the data elements from the host device. In Example 74, the apparatus of claim 72, wherein the data layout transformation comprises data transfer compression to selectively copy data that is accessed during execution of the iteration space block of the task. In Example 75, the apparatus of claim 72, wherein the data layout transformation comprises transposing data elements to reduce a stride of memory accesses. In Example 76, the apparatus of claim 72, wherein the data layout transformation comprises collapsing at least one loop to reduce a number of serial loops in a loop nest, wherein the at least one loop comprises a loop nest.

What is claimed is:

1. An apparatus to transform code, the apparatus comprising:
   memory storing the code; and
   logic circuitry coupled with the memory to:
      identify a tag in the code, the tag to identify a task, wherein the task comprises at least one loop in a loop nest, the loop to process data elements in one or more arrays, the loop nest including one or more parallel loops; and
      automatically generate instructions to determine one or more partitions of the data elements for the at least one loop based on a memory constraint, the data elements accessed by one or more memory access instructions for the one or more arrays within the at least one loop, the memory constraint to identify an amount of memory available for allocation to process the task;
      the logic circuitry is configured to insert instructions to copy data elements from the memory of a host device prior to execution of an iteration space block of the task and to the memory of the host device after completion of the iteration space block of the task, wherein the iteration space block of the task comprises a duration of the task during which a portion of the one or more arrays access data elements in a memory window associated with the iteration space block.

2. The apparatus of claim 1, wherein the logic circuitry is configured to determine one or more iteration space blocks for the parallel loops, each iteration space block to identify a subset of the data elements to be processed by a partition of the one or more arrays.

3. The apparatus of claim 2, wherein the logic circuitry is configured to determine a memory window for each of the iteration space blocks, wherein the memory window comprises a portion of the amount of memory available for allocation to process the task for a span of one of the iteration space blocks, wherein the span is the data elements in the one or more arrays that are accessed by a duration of a single iteration block of the task.

4. The apparatus of claim 1, wherein the logic circuitry is configured to transform array accesses.

5. The apparatus of claim 1, wherein the logic circuitry is configured to insert instructions to call a runtime library to calculate an iteration space block for the at least one loop.

6. The apparatus of claim 1, wherein the logic circuitry is configured to insert instructions to perform a data layout transformation while copying the data elements from the host device.

7. A method to transform code, the method comprising:
   identifying, by a compiler logic circuitry, a tag in the code to identify a task, wherein the task comprises at least one loop in a loop nest, the loop to process data elements in one or more arrays, the loop nest including one or more parallel loops; and
   automatically generating, by the compiler logic circuitry, instructions to determine one or more partitions for the at least one loop to partition data elements, accessed by one or more memory access instructions for the one or more arrays within the at least one loop, based on a memory constraint, the memory constraint to identify an amount of memory available for allocation to process the task, wherein automatically generating instructions comprises insertion of instructions to copy data elements from the memory of a host device prior to execution of an iteration space block of the task and to the memory of the host device after completion of the iteration space block of the task, wherein the iteration space block of the task comprises a duration of the task during which a portion of the one or more arrays access data elements in a memory window associated with the iteration space block.

8. The method of claim 7, further comprising determining the memory constraint based on the amount of memory available to process the task at runtime.

9. The method of claim 8, wherein automatically generating instructions comprises determining one or more iteration space blocks for the parallel loops, each iteration space block to identify a subset of the data elements to be processed by a partition of the one or more arrays.

10. The method of claim 9, wherein automatically generating instructions comprises determining non-overlapping subsets of the data elements for the one or more iteration space blocks.

11. The method of claim 9, wherein automatically generating instructions comprises determining a memory window for the iteration space blocks, wherein the memory window comprises a portion of the amount of memory available for allocation to process the task for a span of one of the iteration space blocks, wherein the span is the data elements in the one or more arrays that are accessed by a duration of a single iteration block of the task.

12. The method of claim 7, wherein automatically generating instructions comprises transforming array accesses.

13. A system to transform code, the system comprising:
   a memory comprising a dynamic random-access memory and the code; and
   logic circuitry coupled with the memory to identify a tag in the code to identify a task, wherein the task comprises at least one loop in a loop nest, the loop to process data elements in one or more arrays, the loop nest including one or more parallel loops; and to automatically generate instructions to determine one or more partitions for the at least one loop to partition data elements, accessed by one or more memory access instructions for the one or more arrays within the at least one loop, based on a memory constraint, the memory constraint to identify an amount of memory available for allocation to process the task;
   the logic circuitry configured to insert instructions to copy data elements from the memory of a host device prior to execution of an iteration space block of the task and to the memory of the host device after completion of the iteration space block of the task, wherein the iteration space block of the task comprises a duration of the task during which a portion of the one or more arrays access data elements in a memory window associated with the iteration space block.

14. The system of claim 13, wherein the logic circuitry is configured to determine non-overlapping spans for the memory windows.

15. The system of claim 13, wherein the logic circuitry is configured to insert instructions to perform a data layout transformation while copying the data elements from the host device.

16. The system of claim 15, wherein the data layout transformation comprises data transfer compression to densely store the data elements.

17. The system of claim 15, wherein the data layout transformation comprises a data transposition to reduce a stride of memory accesses.

18. A non-transitory machine-readable medium containing instructions, which when executed by a processor, cause the processor to perform operations, the operations comprising:
- identifying a tag in the code to identify a task, wherein the task comprises at least one loop in a loop nest, the loop to process data elements in one or more arrays, the loop nest including one or more parallel loops; and
- automatically generating instructions to determine one or more partitions for the at least one loop to partition data elements, accessed by one or more memory access instructions for the one or more arrays within the at least one loop, based on a memory constraint, the memory constraint to identify an amount of memory available for allocation to process the task, wherein automatically generating instructions comprises inserting instructions to copy data elements from the memory of a host device prior to execution of an iteration space block of the task and to the memory of the host device after completion of the iteration space block of the task, wherein the iteration space block of the task comprises a duration of the task during which a portion of the one or more arrays access data elements in a memory window associated with the iteration space block.

19. The machine-readable medium of claim 18, wherein automatically generating instructions comprises determining one or more iteration space blocks for the parallel loops, each iteration space block to identify a subset of the data elements to be processed by a partition of the one or more arrays.

20. The machine-readable medium of claim 19, wherein automatically generating instructions comprises determining a memory window for the iteration space blocks, wherein the memory window comprises a portion of the amount of memory available for allocation to process the task for a span of one of the iteration space blocks, wherein the span is the data elements in the one or more arrays that are accessed by a duration of a single iteration block of the task.

21. The machine-readable medium of claim 18, wherein automatically generating instructions comprises transforming array accesses.

22. The machine-readable medium of claim 18, wherein automatically generating instructions comprises inserting instructions to perform a data layout transformation while copying the data elements from the host device.

* * * * *